(12) United States Patent
Kim et al.

(10) Patent No.: US 10,262,537 B1
(45) Date of Patent: Apr. 16, 2019

(54) AUTONOMOUS OPTIMIZATION OF PARALLEL PARKING SPACE UTILIZATION

(71) Applicant: TOYOTA JIDOSHA KABUSHIKI KAISHA, Toyota-shi, Aichi-ken (JP)

(72) Inventors: Eric Shinwon Kim, San Francisco, CA (US); BaekGyu Kim, Cupertino, CA (US); Shinichi Shiraishi, San Jose, CA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/877,384

(22) Filed: Jan. 22, 2018

(51) Int. Cl.
  *B60Q 1/48* (2006.01)
  *G08G 1/14* (2006.01)
  *H04W 4/46* (2018.01)
  *H04W 4/44* (2018.01)

(52) U.S. Cl.
  CPC ............. *G08G 1/143* (2013.01); *G08G 1/147* (2013.01); *H04W 4/44* (2018.02); *H04W 4/46* (2018.02)

(58) Field of Classification Search
  CPC .................................. G08G 1/00; H04W 4/00
  See application file for complete search history.

(56) References Cited

U.S. PATENT DOCUMENTS

| | | | |
|---|---|---|---|
| 8,489,283 B2 * | 7/2013 | Widmann | B60R 1/00 180/204 |
| 9,610,943 B2 * | 4/2017 | Lavoie | B60W 30/06 |
| 2017/0212511 A1 | 7/2017 | Paiva Ferreira et al. | |

FOREIGN PATENT DOCUMENTS

| | | | |
|---|---|---|---|
| JP | 2017512347 A | 5/2017 | |
| WO | 2015114592 A1 | 8/2015 | |

* cited by examiner

*Primary Examiner* — Shirley Lu
(74) *Attorney, Agent, or Firm* — Patent Law Works LLP

(57) ABSTRACT

In an example embodiment, a computer-implemented method is disclosed that broadcasts a request for a parking space, receives response(s) from responsive vehicle(s), and extracts set(s) of response data from the received response(s). Each set corresponds to a responsive vehicle and includes a vehicle attribute and a situational context for that corresponding responsive vehicle. The method further generates a dynamic parking model based on the vehicle attribute and the situational context included in each set of response data. The dynamic parking model maps estimated position(s) of the responsive vehicle(s) and further identifies, for each responsive vehicle, estimated unutilized distance(s) between the responsive vehicle and surrounding object(s) corresponding to the responsive vehicle. The method further determines, from the responsive vehicle(s), a group of one or more relocatable vehicles based on the dynamic parking model, and instructs the group to relocate to create the requested parking space.

33 Claims, 15 Drawing Sheets

800

```
<vehicle-info>
        <make> Toyota </make>
        <model> RAV 4 </model>
        <color> white </color>
        <ID>BZSE9ZW9O3LXZCEZLN7M</ID>
</vehicle-info>
</situational context>
        <positional>
                <coords> 40.765701, -111.860139 </coords>
                <length> 467.36 </length>
                <orientation> 271 </orientation>
        </positional>
        <front>
                <type> vehicle </type>
                <confidence> 81.5 </confidence>
                <distance> 40.64 </distance>
        </front>
        <rear>
                <type> vehicle </type>
                <confidence> 84.5 </confidence>
                <distance> 60.96 </distance>
        </rear>
        <right>
                <object1>
                        <type> fire hydrant </type>
                        <confidence> 72.5 </confidence>
                        <relative-position> 302 </relative-position>
                        <distance> 254 </distance>
                </object1>
                <object2>
                        <type> tree </type>
                        <confidence> 25.7 </confidence>
                        <relative-position> 59 </relative-position>
                        <distance> 812.8 </distance>
                </object2>
        </right>
        <left>
        </left>
</situational context>
```

Figure 8

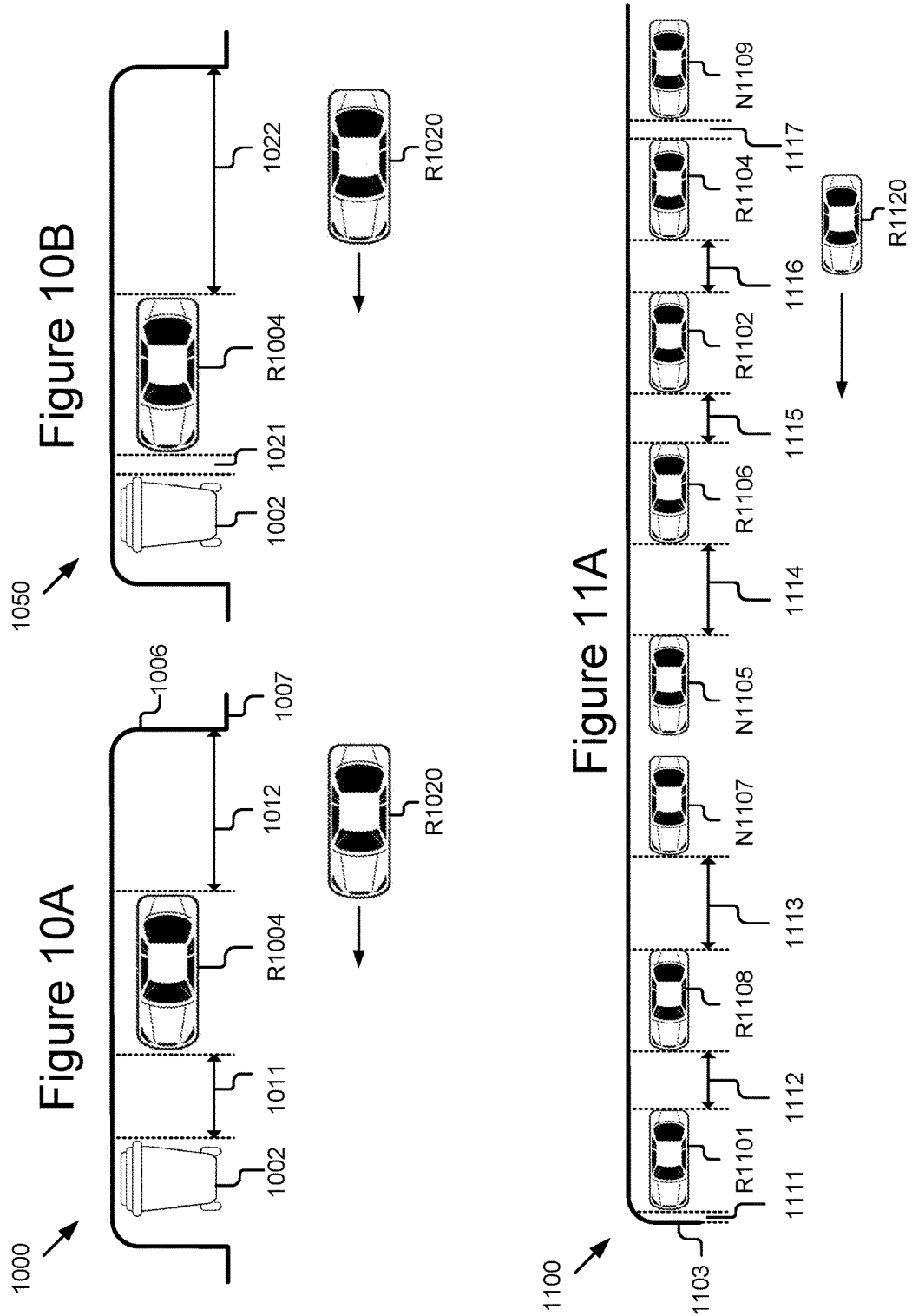

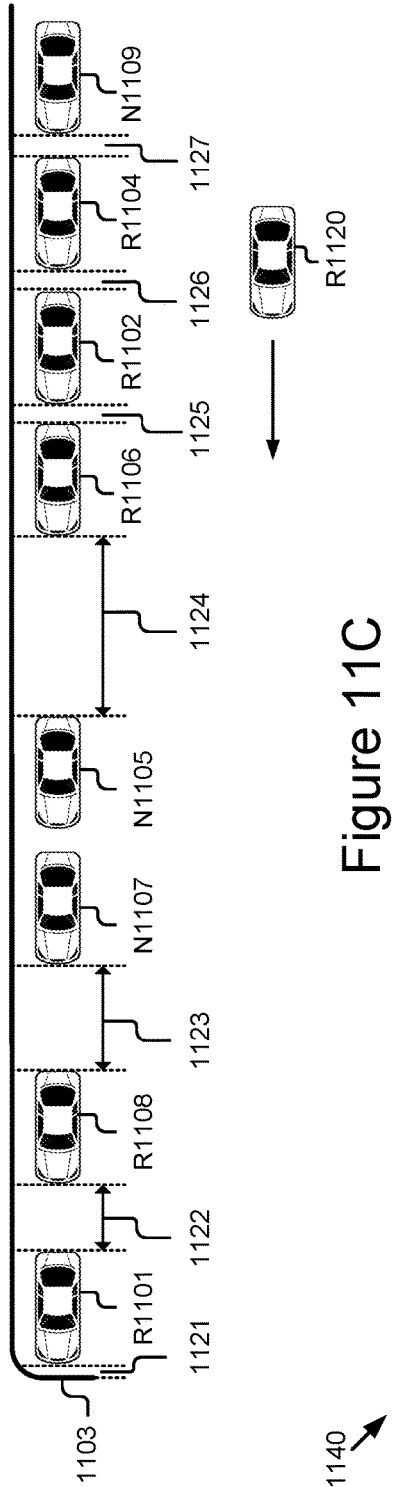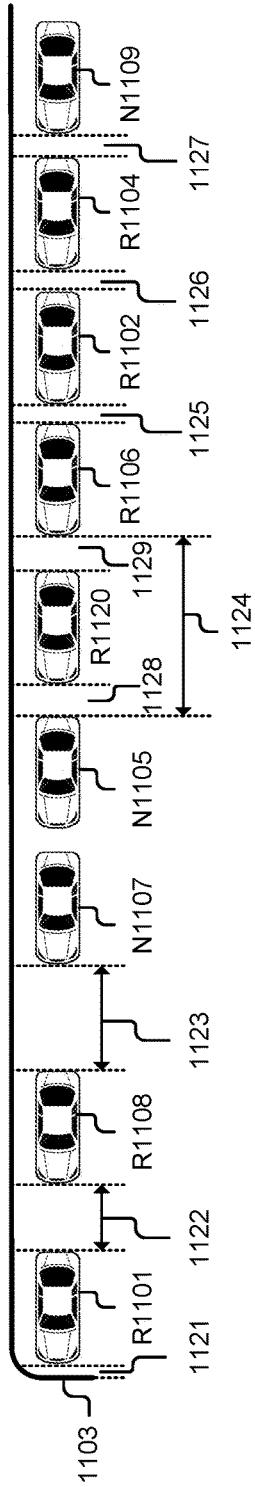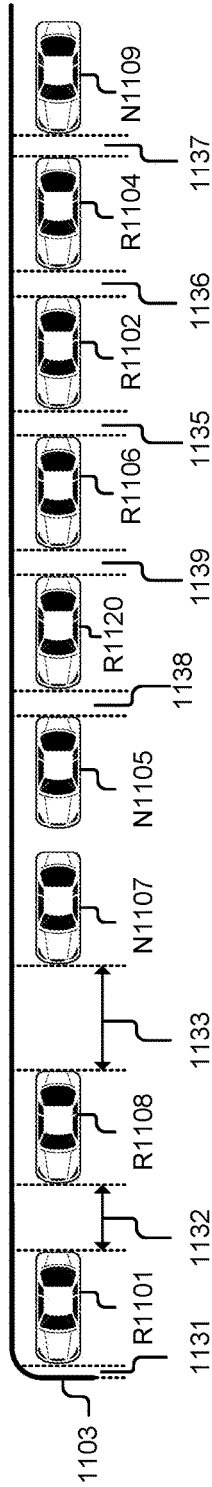

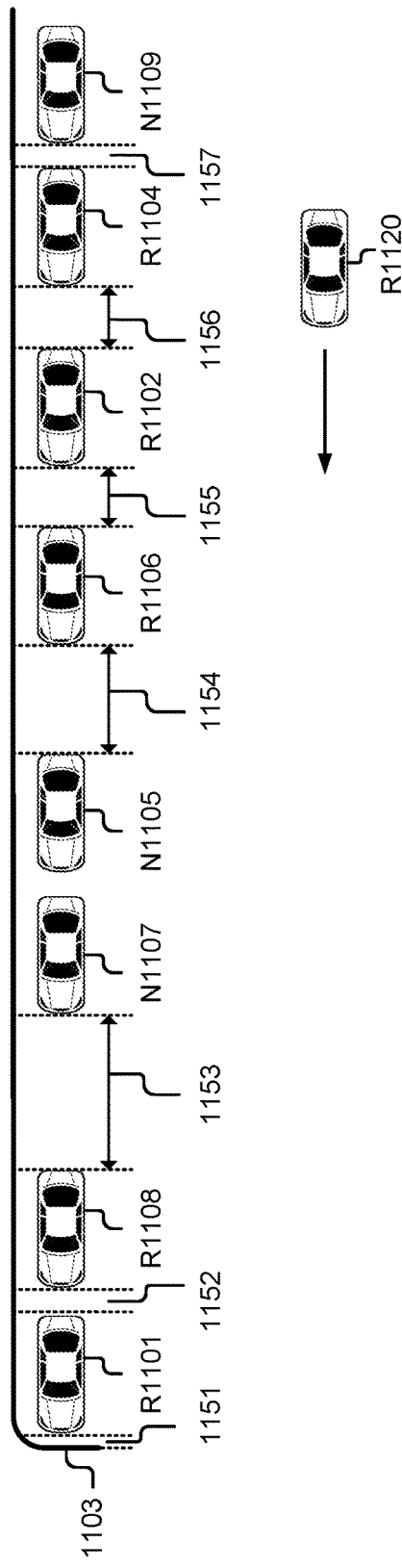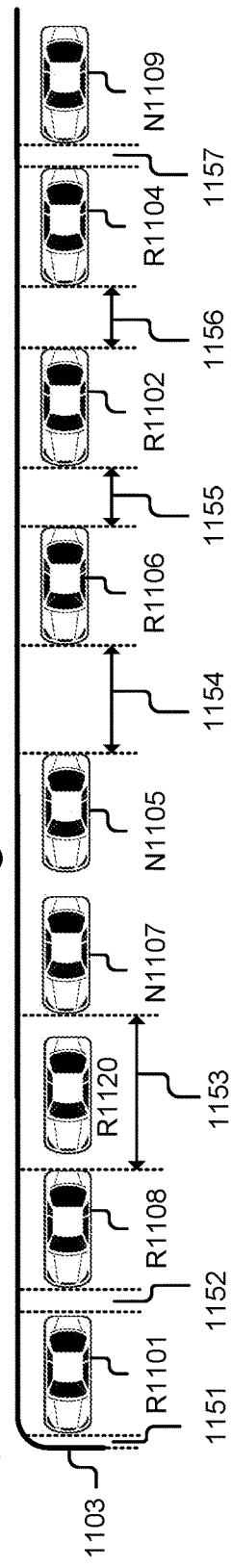

AUTONOMOUS OPTIMIZATION OF PARALLEL PARKING SPACE UTILIZATION

BACKGROUND

The present disclosure relates to autonomous control of vehicles.

Space available along a curb is often limited for parallel parking, especially in busy urban areas. This limited curb space is often used inefficiently due to different vehicle lengths as well as asynchronous arrivals and departures of the vehicles. For example, a small compact car may claim a parking spot previously occupied by a big truck, thus creating a relatively large distance between the compact car and its proximate vehicle. This individual distance may be insufficient for another vehicle to park, while the aggregation of multiple intervals between parked vehicles may be sufficient to accommodate one or even more additional vehicles.

An existing solution for addressing parallel parking space underutilization is to demarcate curb space with painted borders or parking meters for each individual parking spot. However, this existing approach generally requires the area designated for each parking spot to be adequate to accommodate vehicles of different sizes and also include a buffer space needed for the vehicles to maneuver in and out. As the parking spots are established in advance, this existing solution is inflexible and inefficient because it is incapable of allocating parking spaces according to vehicle size and specific parking situation in a dynamic manner.

Another existing solution is to implement an automated parking system. However, the automated parking system is generally designed for a specific structure of a particular parking lot and often requires implementation of new infrastructures. As a result, this approach is inflexible and expensive. In addition, the automated parking system generally requires the parked vehicles to be able to communicate with a centralized control unit to be aware of the vehicles' positions and to control the vehicles' relocation. Therefore, it is impossible for the automated parking system to operate when one or more parked vehicles are not provided with this ability, and thus are not responsive to the control of the centralized control unit. Furthermore, the automated parking system generally cannot adapt its operation to presence of random objects (e.g., pedestrians or trashcans) in the surrounding environment. Thus, these objects are not allowed in the parking lot when the automated parking system is in operation.

SUMMARY

The subject matter described in this disclosure overcomes the deficiencies and limitations of the existing solutions by providing novel technology for autonomous optimization of parking space utilization.

According to one innovative aspect of the subject matter described in this disclosure, a computer-implemented method comprises: broadcasting a request for a parking space; receiving one or more responses from one or more responsive vehicles; extracting one or more sets of response data from the one or more received responses, each set of the one or more sets of response data corresponding to a responsive vehicle and including a vehicle attribute and a situational context for that corresponding responsive vehicle; generating a dynamic parking model based on the vehicle attribute and the situational context included in each set of the one or more sets of response data, the dynamic parking model mapping one or more estimated positions of the one or more responsive vehicles, the dynamic parking model further identifying, for each responsive vehicle, one or more estimated unutilized distances between the responsive vehicle and one or more surrounding objects corresponding to the responsive vehicle; determining, from the one or more responsive vehicles, a group of one or more relocatable vehicles based on the dynamic parking model; and instructing the group of one or more relocatable vehicles to relocate to create the requested parking space.

In general, another innovative aspect of the subject matter described in this disclosure may be embodied in computer-implemented methods comprising: broadcasting a request for a parking space; receiving one or more responses from one or more responsive vehicles; extracting one or more sets of response data from the one or more received responses; generating a dynamic parking model based on the one or more sets of response data, the dynamic parking model mapping one or more estimated positions of the one or more responsive vehicles, the dynamic parking model further identifying, for each responsive vehicle, one or more estimated unutilized distances between the responsive vehicle and one or more surrounding objects corresponding to the responsive vehicle; determining, from the one or more responsive vehicles, a first group of one or more relocatable vehicles based on the dynamic parking model; instructing the first group of one or more relocatable vehicles to relocate to create the requested parking space; and instructing a to-be-parked vehicle to claim the created parking space.

In general, another innovative aspect of the subject matter described in this disclosure may be embodied in systems comprising: one or more processors; one or more memories storing instructions that, when executed by the one or more processors, cause the system to broadcast a request for a parking space; receive one or more responses from one or more responsive vehicles; extract one or more sets of response data from the one or more received responses, each set of the one or more sets of response data corresponding to a responsive vehicle and including a vehicle attribute and a situational context for that corresponding responsive vehicle; generate a dynamic parking model based on the vehicle attribute and the situational context included in each set of the one or more sets of response data, the dynamic parking model mapping one or more estimated positions of the one or more responsive vehicles, the dynamic parking model further identifying, for each responsive vehicle, one or more estimated unutilized distances between the responsive vehicle and one or more surrounding objects corresponding to the responsive vehicle; determine, from the one or more responsive vehicles, a group of one or more relocatable vehicles based on the dynamic parking model; and instruct the group of one or more relocatable vehicles to relocate to create the requested parking space.

These and other implementations may each optionally include one or more of the following features: that the situational context for a particular responsive vehicle from among the one or more responsive vehicles is extracted from a particular response received from the particular responsive vehicle, the situational context including positional data indicating an estimated position of the particular responsive vehicle and directional object data describing the one or more surrounding objects corresponding to the particular responsive vehicle that were captured by one or more externally-facing sensors of the particular responsive vehicle; that generating the dynamic parking model includes determining a sequence of a first responsive vehicle and a second responsive vehicle based on first positional data included in the situational context of the first responsive vehicle and second positional data included in the situational context of the second responsive vehicle, determining a first surrounding object adjacent to the first responsive vehicle and a first estimated unutilized distance from the first responsive vehicle to the first surrounding object based on first directional object data included in the situational context of the first responsive vehicle, and determining a second surrounding object adjacent to the second responsive vehicle and a second estimated unutilized distance from the second responsive vehicle to the second surrounding object based on second directional object data included in the situational context of the second responsive vehicle; that wherein generating the dynamic parking model includes classifying the first surrounding object adjacent to the first responsive vehicle into an object category, and filtering the first surrounding object based on the object category of the first surrounding object; that generating the dynamic parking model includes classifying the first surrounding object adjacent to the first responsive vehicle into an object category, determining that the object category represents an obstruction, responsive to determining that the object category represents the obstruction, determining an obstruction position and an obstruction footprint associated with the first surrounding object based on the positional data and the directional object data included in the situational context of the first responsive vehicle, and updating the dynamic parking model to indicate that the first surrounding object is the obstruction and to include the obstruction position and the obstruction footprint associated with the obstruction; that generating the dynamic parking model includes classifying the first surrounding object adjacent to the first responsive vehicle into an object category, determining that the object category represents a vehicle, and responsive to determining that the object category represents the vehicle, determining that the first surrounding object adjacent to the first responsive vehicle is the second responsive vehicle and updating the dynamic parking model to indicate that the first responsive vehicle and the second responsive vehicle are directly adjacent; that determining that the first surrounding object adjacent to the first responsive vehicle is the second responsive vehicle includes determining that the first estimated unutilized distance from the first responsive vehicle to the first surrounding object is approximately equivalent to the second estimated unutilized distance from the second responsive vehicle to the second surrounding object; that generating the dynamic parking model includes classifying the first surrounding object adjacent to the first responsive vehicle into an object category, determining that the object category represents a vehicle, and responsive to determining that the object category represents the vehicle, determining that the first surrounding object adjacent to the first responsive vehicle is not the second responsive vehicle and updating the dynamic parking model to indicate that the first surrounding object is an obstruction; that extracting an orientation of a particular responsive vehicle from a set of response data associated with the particular responsive vehicle, determining that the orientation of the particular responsive vehicle is substantially different from a moving direction of a to-be-parked vehicle, and responsive to determining that the orientation of the responsive vehicle is substantially different from the moving direction of the to-be-parked vehicle, filtering the set of response data associated with the particular responsive vehicle from the one or more sets of response data; that determining the group of one or more relocatable vehicles includes determining a provisional group of relocatable vehicles based on an optimization criterion, the provisional group of relocatable vehicles including one or more sequential responsive vehicles in the dynamic parking model, determining that the requested parking space is accommodatable by the provisional group of relocatable vehicles, and responsive to determining that the requested parking space is accommodatable by the provisional group of relocatable vehicles, identifying the provisional group of relocatable vehicles to be the group of one or more relocatable vehicles; that determining that the requested parking space is accommodatable by the provisional group of relocatable vehicles includes computing an estimated amount of available space generated by relocating the provisional group of relocatable vehicles, and comparing the estimated amount of available space to the requested parking space; that determining a moving distance, a moving direction, and a moving order for each responsive vehicle in the group of one or more relocatable vehicles, and instructing each responsive vehicle in the group of one or more relocatable vehicles to relocate based on the moving distance, the moving direction, and the moving order to create the requested parking space; that determining the group of one or more relocatable vehicles includes determining a provisional group of relocatable vehicles based on an optimization criterion, the provisional group of relocatable vehicles including one or more sequential responsive vehicles in the dynamic parking model, determining that the requested parking space is not accommodatable by the provisional group of relocatable vehicles, and redetermining the provisional group of relocatable vehicles based on the dynamic parking model; that determining the group of relocatable vehicles includes determining a provisional group of relocatable vehicles based on an optimization criterion, the provisional group of relocatable vehicles including one or more sequential responsive vehicles in the dynamic parking model, determining that the requested parking space is not accommodatable by the provisional group of relocatable vehicles, updating the dynamic parking model to include an additional responsive vehicle based on a set of response data associated with the additional responsive vehicle, and redetermining the provisional group of relocatable vehicles based on the updated dynamic parking model; that responsive to the created parking space being claimed by the to-be-parked vehicle, updating the dynamic parking model to include the to-be-parked vehicle; that determining a second group of one or more relocatable vehicles based on an optimization criterion, the second group of one or more relocatable vehicles including one or more sequential responsive vehicles in the updated dynamic parking model, determining a moving distance, a moving direction, and a moving order for each responsive vehicle in the second group of one or more relocatable vehicles, and instructing each responsive vehicle in the second group of one or more relocatable vehicles to relocate based on the moving distance, the moving direction, and the moving order; that the second group of one or more relocatable vehicles includes the to-be-parked vehicle.

Other implementations of one or more of these and other aspects include corresponding systems, apparatus, and computer programs, configured to perform the actions of methods, encoded on non-transitory computer storage devices.

The novel technology presented in this disclosure is particularly advantageous in a number of respects. For example, the technology described herein flexibly relocates parked vehicles based on particular parking situations, thereby allowing the curb space to be utilized effectively. As a further example, the present technology is capable of relocating vehicles to create the requested parking space even if non-responsive vehicles or other types of obstructions that cannot be relocated are present in the line of parked vehicles. The present technology is also cost-effective because, in some embodiments, it does not require implementation of a centralized control unit or additional infrastructures. Furthermore, the relocation of vehicles performed by the technology described herein can conform to parking rules and regulations. The relocating execution can also be adjusted responsively when random objects (e.g., pedestrians, pets, other moving vehicles, etc.) are detected in the scene.

It should be understood that the foregoing advantages are provided by way of example and that the technology may have numerous other advantages and benefits.

The disclosure is illustrated by way of example, and not by way of limitation in the figures of the accompanying drawings in which like reference numerals are used to refer to similar elements.

BRIEF DESCRIPTION OF THE DRAWINGS

FIG. 8 depicts an example response received from a responsive vehicle.

FIGS. 10A and 10B respectively illustrate a first example parallel parking situation before and after a parked vehicle is relocated to create a requested parking space.

FIGS. 11A and 11B respectively illustrate a second example parallel parking situation before and after a first group of relocatable vehicles is relocated to create a requested parking space.

FIGS. 11C and 11D respectively illustrate the second example parallel parking situation when the created parking space is claimed, and when one or more vehicles are relocated after the created parking space is claimed.

FIGS. 11E and 11F respectively illustrate the second example parallel parking situation when a second group of relocatable vehicles is relocated to create a requested parking space, and when the created parking space is claimed.

DESCRIPTION

The technology described herein can flexibly and efficiently optimize, and in some cases maximize, utilization of curb space in a variety of different parking scenarios by autonomously relocating one or more vehicles. As described in further detail below, the technology includes methods and corresponding systems that can receive responses to a request for parking space from one or more responsive vehicles, and generate a dynamic parking model describing the current parking situation based on the received responses. By way of non-limiting example, a group of relocatable vehicles may be determined and relocated based on the dynamic parking model to create the requested parking space. After the requesting vehicle claims the created parking space or uses the created parking space as a buffer space to vacate its parking spot, one or more responsive vehicles may be relocated to optimize the occupied parking spaces, and thus maximize the parking spaces available to other vehicles for parking.

Figure 1:
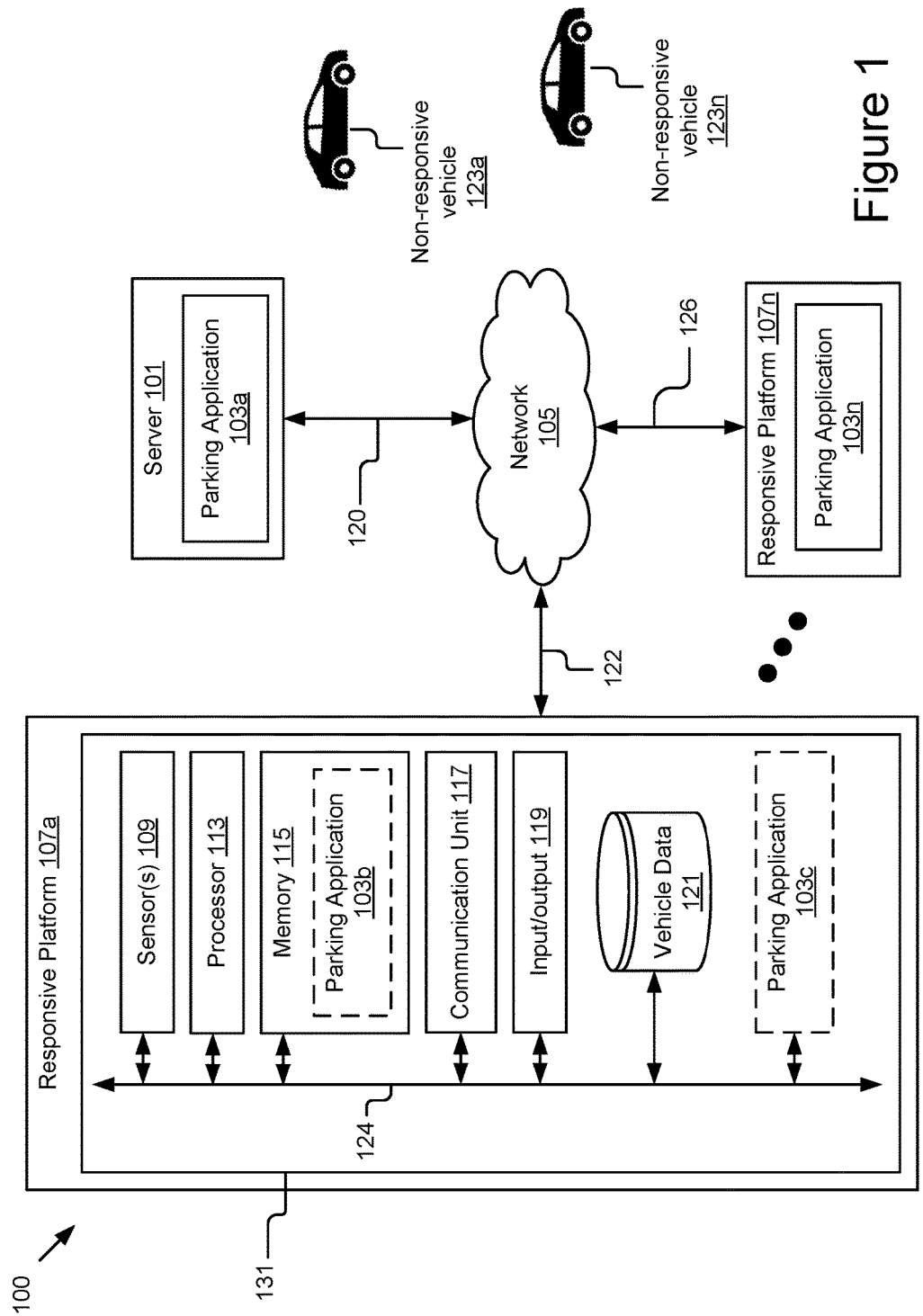
FIG. 1 is a block diagram of an example system for autonomous optimization of parking space utilization.

FIG. 1 is a block diagram of one such example system 100 for autonomous optimization of parking space utilization. As shown, the system 100 includes a server 101 and one or more responsive platforms 107a . . . 107n coupled for electronic communication via a network 105. The system 100 also includes one or more non-responsive vehicles 123a . . . 123n that are not communicatively coupled to the other entities of the system 100, or not capable of communicating when needed (due to system errors, power loss, opt out settings, or other suitable reasons). In FIG. 1 and the remaining figures, a letter after a reference number, e.g., "107a," represents a reference to the element having that particular reference number. A reference number in the text without a following letter, e.g., "107," represents a general reference to instances of the element bearing that reference number. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of responsive platforms 107, non-responsive vehicles 123, or servers 101.

The network 105 may be a conventional type, wired and/or wireless, and may have numerous different configurations including a star configuration, token ring configuration, or other configurations. For instance, the network 105 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.) and/or other interconnected data paths across which multiple devices may communicate.

The network 105 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other suitable protocols. In some embodiments, the network 105 is a wireless network using a connection such as DSRC (Dedicated Short Range Communication), WAVE, 802.11p, a 3G, 4G, 5G+ network, WiFi™, satellite networks, vehicle-to-vehicle (V2V) networks, vehicle-to-infrastructure/infrastructure-to-vehicle (V2I/I2V) networks, or any other wireless networks. Although FIG. 1 illustrates a single block for the network 105 that couples the server 101 and the responsive platform(s) 107, it should be understood that the network 105 may in practice comprise any number of combination of networks, as noted above.

The server 101 may include a hardware and/or virtual server that includes processor(s), memory(ies), and network communication capabilities (e.g., communication unit(s)). The server 101 may be communicatively coupled to the network 105, as reflected by signal line 120. In some embodiments, the server 101 may send and receive data to and from one or more responsive platform(s) 107. In some embodiments, the server 101 may include a parking application 103, as discussed further elsewhere herein.

The responsive platform(s) 107 include computing device(s) 131 having sensor(s) 109, a parking application 103, processor(s) 113, memory(ies) 115, communication unit(s) 117, input/output(s) 119, and a vehicle data store 121. Examples of computing device(s) 131 may include virtual or physical computer processors, control units, micro-controllers, etc., which are coupled to other components of the responsive platform(s) 107, such as one or more sensors 109, actuators, motivators, etc. The responsive platform(s) 107 may be coupled to the network 105 via signal line 122, and may send and receive data to and from other responsive platform(s) 107 and/or the server(s) 101. In some embodiments, the responsive platform(s) 107 are capable of transporting from one point to another. Non-limiting examples of the responsive platform(s) 107 include a vehicle, an automobile, a bus, a boat, a plane, a bionic implant, a robot, or any other platforms with non-transitory computer electronics (e.g., a processor, a memory or any combination of non-transitory computer electronics).

The processor(s) 113 may execute software instructions (e.g., tasks) by performing various input/output, logical, and/or mathematical operations. The processor(s) 113 may have various computing architectures to process data signals. The processor(s) 113 may be physical and/or virtual, and may include a single core or plurality of processing units and/or cores. In the context of the responsive platform 107, the processor may be an electronic control unit (ECU) implemented in the responsive platform 107 such as a car, although other types of platform are also possible and contemplated. The ECUs may receive and store the sensor data as vehicle operation data in the vehicle data store 121 for access and/or retrieval by the parking application 103. In some implementations, the processor(s) 113 may be capable of generating and providing electronic display signals to the input/output device(s) 119, supporting the display of images, capturing and transmitting images, performing complex tasks including various types of feature extraction and sampling, etc. In some implementations, the processor(s) 113 may be coupled to the memory(ies) 115 via the bus 124 to access data and instructions therefrom and store data therein. The bus 124 may couple the processor(s) 113 to the other components of the responsive platform(s) 107 including, for example, the sensor(s) 109, the memory(ies) 115, the communication unit(s) 117, and/or and the vehicle data store 121.

The parking application 103 is computer logic executable to determine a group of relocatable vehicles and instruct the group of relocatable vehicles to relocate to create the requested parking space. The parking application 103 may be included in the responsive platform 107 (e.g., a responsive vehicle) or may be incorporated into an infrastructure (e.g., a roadside unit or a parking meter) that regulates the corresponding curb space. In some embodiments, the parking application 103 may be configured to fully or partially perform the functionalities described herein depending on where the parking application 103 resides. In some embodiments, the parking application 103 can be implemented using software executable by one or more processors of one or more computer devices, using hardware, such as but not limited to a field-programmable gate array (FPGA), an application-specific integrated circuit (ASIC), etc., and/or a combination of hardware and software, etc. The parking application 103 may receive and process the sensor data and/or the vehicle data, and communicate with other elements of the responsive platform 107 via the bus 124, such as the communication unit 117, the input/output device 119, the vehicle data store 121, the memory 115, etc. The parking application 103 is described in details below with reference to at least FIGS. 2-12B.

The memory(ies) 115 include a non-transitory computer-usable (e.g., readable, writeable, etc.) medium, which can be any tangible non-transitory apparatus or device that can contain, store, communicate, propagate or transport instructions, data, computer programs, software, code, routines, etc., for processing by or in connection with the processor(s) 113. For example, the memory(ies) 115 may contain the parking application 103. In some implementations, the memory(ies) 115 may include one or more of volatile memory and non-volatile memory. It should be understood that the memory(ies) 115 may be a single device or may include multiple types of devices and configurations.

The communication unit 117 transmits data to and receives data from other computing devices to which it is communicatively coupled (e.g., via the network 105) using wireless and/or wired connections. The communication unit 117 may include one or more wired interfaces and/or wireless transceivers for sending and receiving data. The communication unit 117 may couple to the network 105 and communicate with other computing nodes, such as other responsive platform(s) 107 and/or server(s) 101, etc. The communication unit 117 may exchange data with other computing nodes using standard communication methods, such as those discussed above.

Input/output (I/O) devices 119 include any standard devices for inputting and/or outputting information. Non-limiting example IO devices 119 may include a screen for displaying notifications (e.g., notification of parking space availability, notification of a relocation status), indicators, an audio reproduction device (e.g., speaker), a microphone, and any other I/O components for facilitating communication and/or interaction with users. Input/output devices 119 can be coupled to the computing device 131 either directly or through intervening I/O controllers.

The sensor(s) 109 may include any type of sensors suitable for the responsive platform(s) 107. The sensor(s) 109 may be configured to collect any type of signal data suitable to determine characteristics of a platform 112 and/or its internal and external environments. Non-limiting examples of the sensor(s) 109 include various optical sensors (CCD, CMOS, 2D, 3D, light detection and ranging (LIDAR), cameras, etc.), audio sensors, motion detection sensors, barometers, altimeters, thermocouples, moisture sensors, IR sensors, radar sensors, other photo sensors, gyroscopes, accelerometers, speedometers, steering sensors, braking sensors, switches, vehicle indicator sensors, windshield wiper sensors, geo-location sensors, orientation sensor, wireless transceivers (e.g., cellular, WiFi™, near-field, etc.), sonar sensors, ultrasonic sensors, touch sensors, proximity sensors, distance sensors, etc. In some embodiments, one or more sensors 109 may include externally facing sensors provided at the front side, rear side, right side, and/or left side of the responsive platform 107 in order to capture the situational context surrounding the responsive platform 107.

The vehicle data store 121 includes a non-transitory storage medium that stores various types of vehicle data being communicated between different components of a given responsive platform 107 using a bus, such as a controller area network (CAN) bus. In some embodiments, the vehicle data may include vehicle operation data collected from multiple sensors 109 coupled to different components of the responsive platform 107 for monitoring operating states of these components, e.g., transmission, speed, acceleration, deceleration, wheel speed (Revolutions Per Minute—RPM), steering angle, braking force, etc. In some embodiments, the vehicle data may also include situational context associated with the responsive platform 107. The situational context may include positional data describing a current estimated position of the responsive platform 107 and/or directional object data describing the surrounding objects captured by the responsive platform 107. In some embodiments, the vehicle data may also include vehicle information of the responsive platform 107, e.g., make and model, color, unique vehicle identifier, etc. Other vehicle data are also possible and contemplated. In some embodiments, the vehicle data store 121 may be part of a data storage system (e.g., a standard data or database management system) for storing and providing access to data.

It should be understood that the system 100 illustrated in FIG. 1 is representative of an example system and that a variety of different system environments and configurations are contemplated and are within the scope of the present disclosure. For example, various acts and/or functionality may be moved from server 101 to responsive platform 107, or vice versa, data may be consolidated into a single data store or further segmented into additional data stores, and some implementations may include additional or fewer computing devices, services, and/or networks, and may implement various functionality client or server-side. Furthermore, various entities of the system may be integrated into a single computing device or system or divided into additional computing devices or systems, etc.

Figure 2:
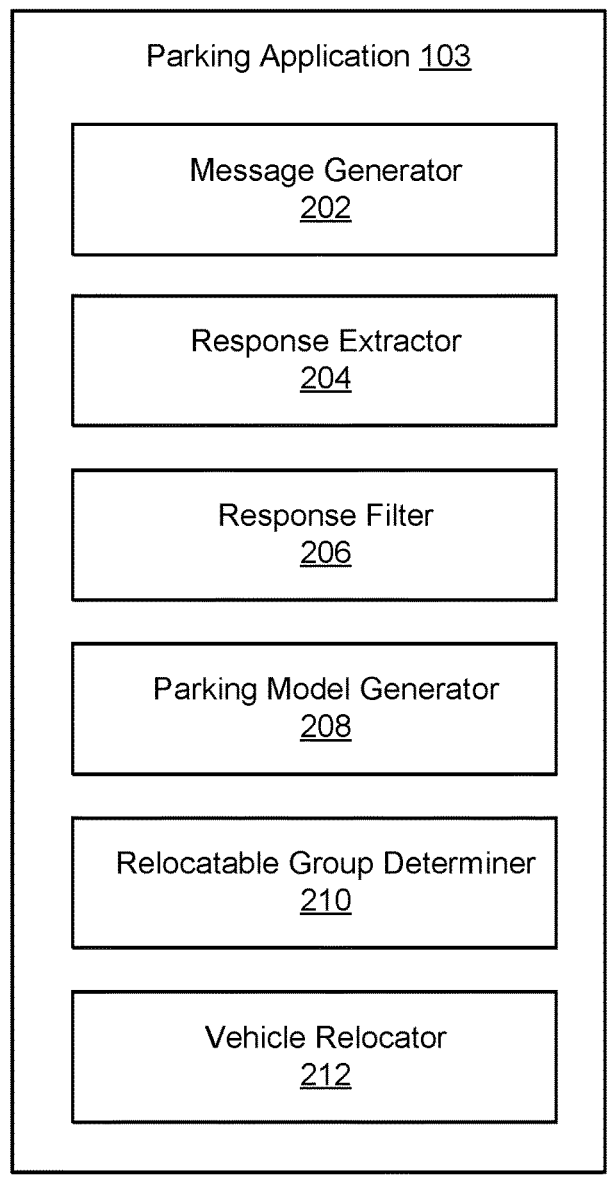
FIG. 2 is a block diagram of an example parking application.

FIG. 2 is a block diagram of an example parking application 103. As depicted, the parking application 103 may include a message generator 202, a response extractor 204, a response filter 206, a parking model generator 208, a relocatable group determiner 210, and a vehicle relocator 212, although it should be understood that the parking application 103 may include additional components such as, but not limited to, a configuration engine, other training engines, an encryption engine, etc., and/or these various components may be combined into a single engine or divided into additional engines.

The message generator 202, the response extractor 204, the response filter 206, the parking model generator 208, the relocatable group determiner 210, and the vehicle relocator 212 may be implemented as software, hardware, or a combination of the foregoing. In some embodiments, the message generator 202, the response extractor 204, the response filter 206, the parking model generator 208, the relocatable group determiner 210, and the vehicle relocator 212 may be communicatively coupled by the bus 124 and/or the processor 113 to one another and/or the other components of the computing device 131. In some embodiments, one or more of the components 103, 202, 204, 206, 208, 210, and/or 212 are sets of instructions executable by the processor 113 to provide their functionality. In further embodiments, one or more of the components 103, 202, 204, 206, 208, 210, and/or 212 are storable in the memory 115 and are accessible and executable by the processor 113 to provide their functionality. In any of the foregoing embodiments, these components 103, 202, 204, 206, 208, 210, and/or 212 may be adapted for cooperation and communication with the processor 113 and other components of the computing device 131.

The parking application 103, and its components 202, 204, 206, 208, 210, and 212 are described in further detail below with reference to at least FIGS. 3-5 and FIGS. 7A-12B.

As discussed elsewhere herein, the parking application 103 is computer logic executable to relocate one or more vehicles to create a requested parking space. The created parking space may be a parking space for an arriving vehicle to park, a buffer space for a departing vehicle to exit the parking space it currently occupies, etc. The created parking space should be sufficiently adequate to accommodate the requesting vehicle and/or sufficient for the requesting vehicle to perform the corresponding maneuvers. The parking spaces assigned to each vehicle in a line of parallel-parked vehicles also need to conform to parking rules and regulations, e.g., no parking within 15 feet from a fire hydrant, no parking that blocks the driveway, etc.

Figure 9:
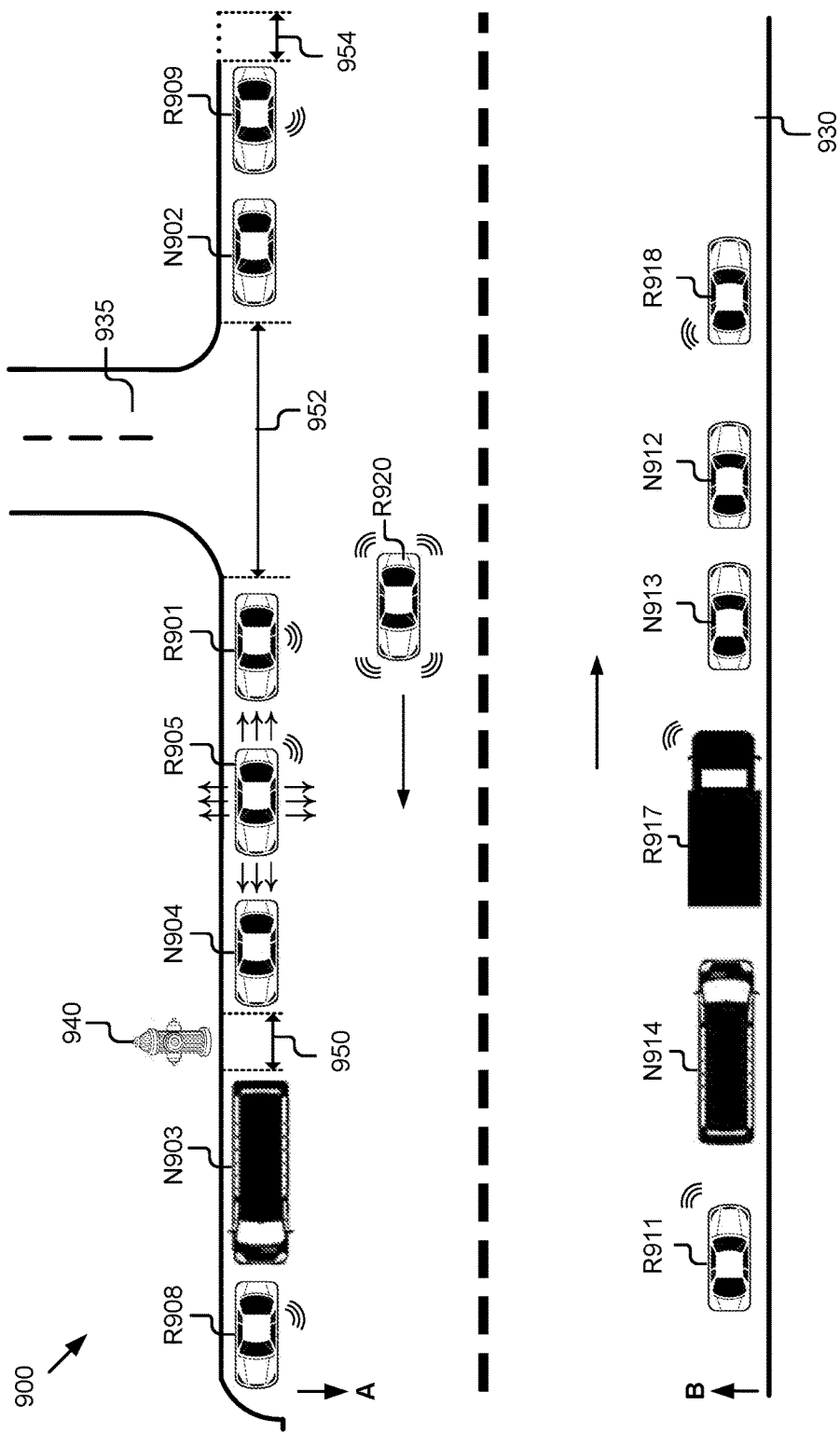
FIG. 9 illustrates an example of a general parallel parking situation.

As an example, a general parallel parking situation 900 is illustrated in FIG. 9. As shown, FIG. 9 depicts a two-way street 930 with two lines of vehicles parked parallel to the curb on both sides (e.g., side A and side B) of the street. In this example, as regulated by the parking rules and regulations, the vehicles are not allowed to park along the curb in the area 950 corresponding to the fire hydrant 940, the area 952 corresponding to the alley 935, and the area 954 indicated as no-parking zone with markings (e.g., red painted curb). As illustrated, the line of parallel-parked vehicles may include various types of vehicles (e.g., car, bus, truck, etc.) with different vehicle sizes. Both responsive vehicles and non-responsive vehicles may be present in the line of parallel-parked vehicles. A responsive vehicle refers to a parked vehicle that has the capability and/or permission of its owner to wirelessly communicate data describing its situational context to other responsive entities (e.g., other responsive vehicles, the server 101, a nearby parking meter that incorporates the parking application 103, etc.). In some cases, the responsive vehicle also refers to a vehicle that has the capability and/or permission of its owner to automatically and autonomously relocate (e.g., without human intervention). On the other hand, a non-responsive vehicle refers to a parked vehicle that does not have the above capabilities or does have these capabilities but is restricted from or incapable of using them (e.g., it is not autonomously enabled, lacks permissions, etc.). As a result, the non-responsive vehicle cannot communicate its situational context to other responsive entities and also cannot be relocated. In the present disclosure, the responsive vehicles are indicated by reference numbers with prefix "R" (responsive) and non-responsive vehicles are indicated by reference numbers with prefix "N" (non-responsive). For example, as shown in FIG. 9, the first line of parallel-parked vehicles on side A of the street 930 is a random mixture of responsive vehicles R908, R905, R901, R909 and non-responsive vehicles N903, N904, N902. The second line of parallel-parked vehicles on side B of the street 930 is a random mixture of responsive vehicles R911, R917, R918 and non-responsive vehicles N914, N913, N912.

Figure 3:
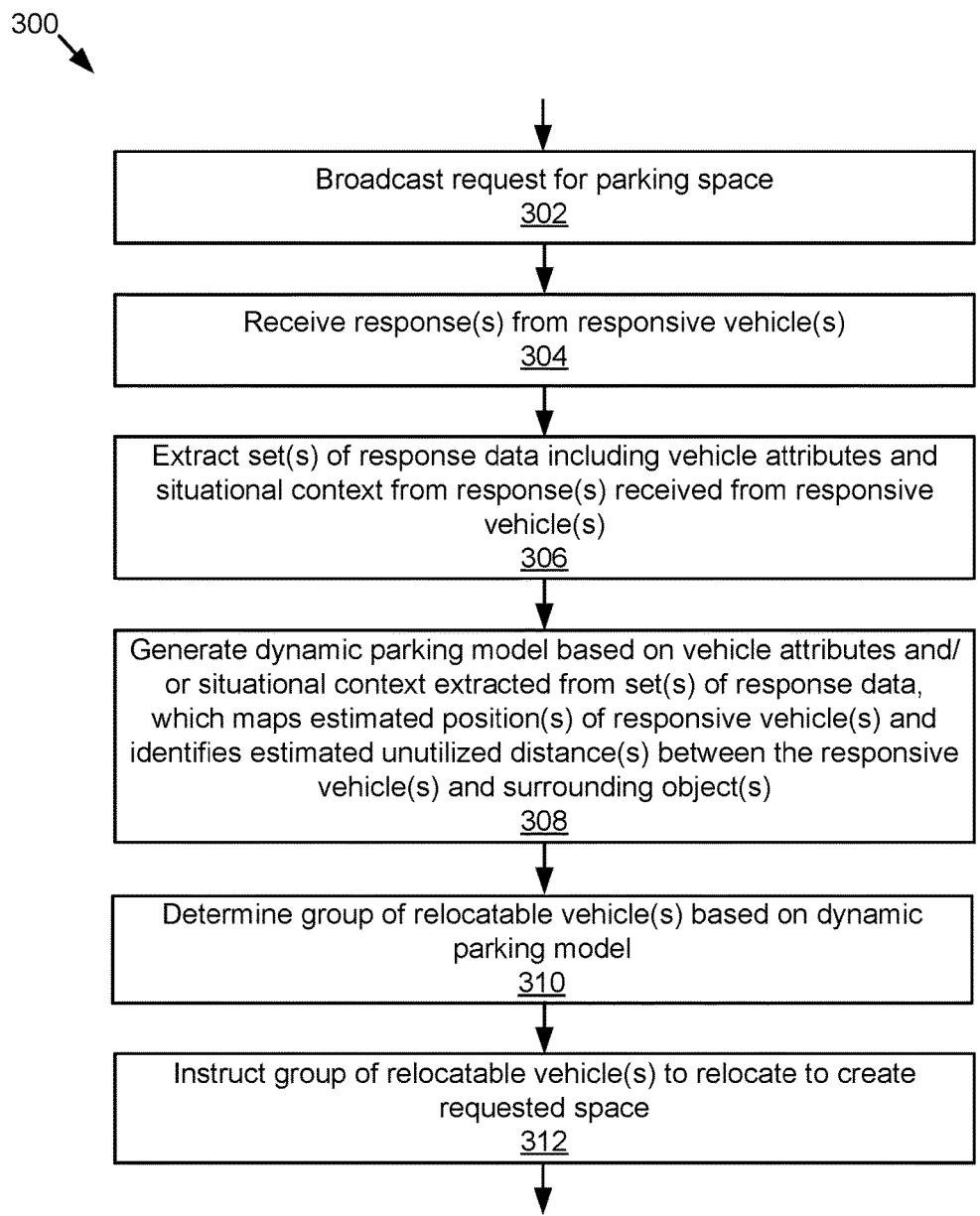
FIG. 3 is a flowchart of an example method for relocating vehicles to create a requested parking space.

FIG. 3 is a flowchart of an example method 300 for relocating one or more vehicles to create a requested parking space. In some embodiments, the method 300 may be performed by the parking application 103 included in the requesting vehicle that seeks the parking space (e.g., the vehicle R920). Alternatively, the relocation of one or more responsive vehicles to create the requested parking space may be coordinated on behalf of the requesting vehicle by the parking application 103 included in a responsive vehicle currently parked in the line of parallel-parked vehicles, the parking application 103 incorporated in a nearby infrastructure (e.g., a parking meter) that regulates the corresponding curb space, a remote server coupled to the network 105, a version of the parking application 103 that is distributed across one or more moving platforms, infrastructures, and/or remote servers, etc. The requesting vehicle may be referred to herein as a to-be-parked vehicle that seeks a parking space to enter. However, it should be understood that the requesting vehicle may also be a departing vehicle that seeks buffer space to maneuver out of its current parking space.

In block 302, the message generator 202 is executable (e.g., by programming the processor(s) 113) to generate and broadcast a request for a parking space. For example, as depicted in FIG. 9, the to-be-parked vehicle R920 may generate and broadcast the request for the parking space using a wireless communication channel. The request for a parking space may or may not include the size of the requested parking space (e.g., length=580 cm).

In block 304, the to-be-parked vehicle may receive one or more responses to the request for the parking space from one or more responsive vehicles, e.g., via the communication unit 117. For example, in response to the request for the parking space, each responsive vehicle within the communication range of the to-be-parked vehicle R920 may generate a response describing the situational context around it and send the generated response to the to-be-parked vehicle R920. In this example, the to-be-parked vehicle R920 may receive responses from the responsive vehicles R908, R905, R901, R909 and the responsive vehicles R911, R917, R918. On the other hand, the non-responsive vehicles in the line of parallel-parked vehicles remain silent as illustrated in FIG. 9. As a result, the to-be-parked vehicle R920 may be informed of the situational context surrounding each responsive vehicle but may not be aware of the situational context surrounding the non-responsive vehicles in the line of parallel-parked vehicles.

Figure 6:
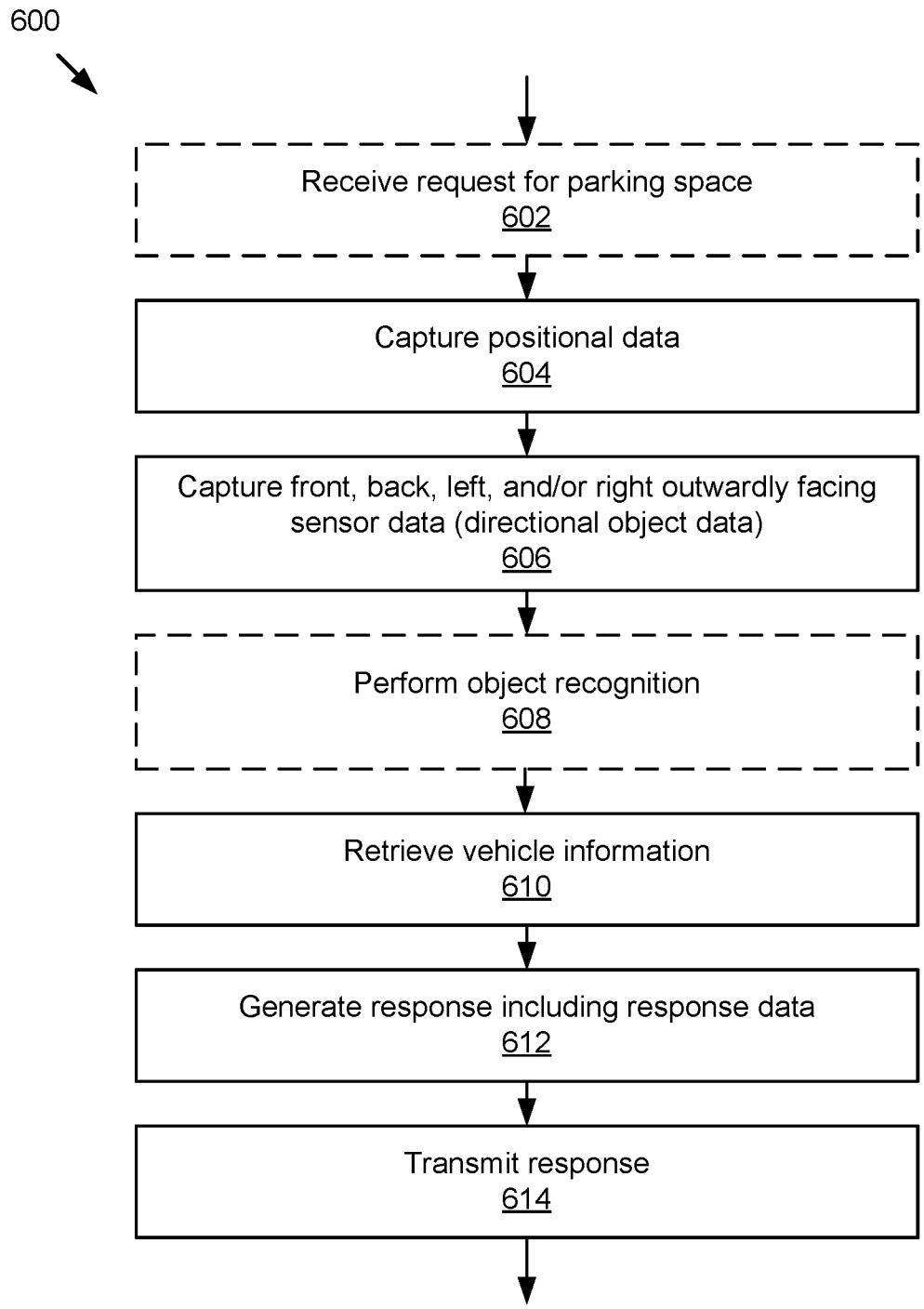
FIG. 6 is a flowchart of an example method for generating a response to a request for a parking space.

By way of further illustration, FIG. 6 is a flowchart of an example method 600 for generating a response to a request for a parking space. In some embodiments, the method 600 may be performed by the message generator 202 included in the responsive vehicle that receives the request for the parking space. As described elsewhere herein, the message generator 202 may have different capabilities depending on the configuration of the parking application 103. For example, if the parking application 103 is included in a responsive vehicle, the message generator 202 may be configured to generate the request for the parking space and generate the response to the request for the parking space. On the other hand, if the parking application 103 is included in a responsive entity other than a responsive vehicle (e.g., the server 101, a parking meter, a roadside unit, etc.), the message generator 202 may be configured to generate the request for the parking space on behalf of the responsive vehicle.

In block 602, the message generator 202 may receive the request for the parking space, e.g., via the communication unit 117. In some embodiments, the message generator 202 may generate the response when it receives the request for the parking space. In some embodiments, the message generator 202 may generate the response in advance and store the response in the vehicle data store 121. In some cases, the operations in block 602 may be optionally performed, depending on the configuration.

In block 604, the message generator 202 may capture the positional data of the responsive vehicle using the GPS sensor and/or the orientation sensor. In some embodiments, the positional data may indicate the estimated position of the responsive vehicle and may include the estimated GPS coordinates of the responsive vehicle (e.g., 40.765701° N, 111.860139° W), the length of the responsive vehicle (e.g., 467.36 cm), the estimated distances from the point of GPS coordinates to front end and rear end of the responsive vehicle (e.g., 263.5 cm and 172.86 cm), and/or the estimated orientation of responsive vehicle (e.g., 271/360°), etc. In some embodiments, the message generator 202 may capture the positional data of the responsive vehicle before the responsive vehicle is put in parked, and store the positional data in the vehicle data store 121 and/or the memory 115 for later retrieval. In some embodiments, the positional data may be determined on demand.

In block 606, the message generator 202 may capture the directional object data of the responsive vehicle using the sensors 109. In some embodiments, the directional object data may describe one or more surrounding objects corresponding to the responsive vehicle. The one or more surrounding objects corresponding to the responsive vehicle may be the surrounding objects captured by outwardly facing sensors 109 (e.g., sensors disposed at the front side, rear side, right side, and/or left side of the responsive vehicle (e.g., the responsive vehicle R905, etc.).

As an example, the sensors 109 may capture image data of the environment around the responsive vehicle. In some embodiments, the image sensor data captured by the sensors 109 may be used directly as the directional object data. In other embodiments, the image sensor data may be further processed to extract directional object data of the one or more surrounding objects corresponding to the responsive vehicle. For example, in block 608, the message generator 202 may perform object recognition on the image sensor data, e.g., using vision algorithm. As an example, the message generator 202 may analyze the image data captured by the right side sensors to detect one or more objects present on the right side of the responsive vehicle. For each detected object, the message generator 202 may identify the type of object (e.g., fire hydrant), the confidence score associated with the identified type of object (e.g., 72.5%), the relative position of the captured object to the responsive vehicle (e.g., 302/360°), the distance between the captured object and the responsive vehicle (e.g., 254 cm), etc. It should be understood that the sensor data captured by other types of sensors (e.g., proximity sensors, distance sensors, sonar sensors, etc.) may also be used to determine directional object data associated with the responsive vehicle.

In block 610, the message generator 202 may retrieve vehicle information associated with the responsive vehicle from the vehicle data store 121. Examples of the vehicle information include, but are not limited to, make (e.g., Toyota), model (e.g., RAV 4), color (e.g., white), unique vehicle identifier (e.g., Vehicle Identification Number), dimensions of the responsive vehicle (e.g., length: 467.36 cm, width: 185.42 cm, height: 172.72 cm), etc.

In block 612, the message generator 202 may generate a response to the request for the parking space based on the positional data, the directional object data, and the vehicle information. In particular, the response may include response data aggregated from the positional data, the directional object data, the vehicle information, and may be generated in any form of structured data file format such as XML (Extensible Markup Language), CSV (Comma Separated Value), JSON (JavaScript Object Notation), and/or compressed and/or compiled formats, etc. In some embodiments, the response may conform to a predefined template to be efficiently exchanged between different responsive vehicles and/or other responsive entities.

FIG. 8 demonstrates an example response 800 generateable by the message generator 202. As shown, the response data in the response 800 may include the vehicle information of the responsive vehicle and the situational context captured by the responsive vehicle. In particular, as illustrated in FIG. 8, the vehicle information aspect of the response 800 may include a make attribute indicating the make of the responsive vehicle as "Toyota," a model attribute indicating the model of the responsive vehicle as "RAV 4," a color attribute indicating the color of the responsive vehicle as "white," and an ID attribute indicating the Vehicle Identification Number (VIN) of the responsive vehicle as "BZSE9ZW9O3LXZCEZLN7M."

As depicted, the situational context aspect of the response 800 may include positional data of the responsive vehicle (e.g., estimated GPS coordinates, length, estimated orientation, etc.) and directional object data (e.g., type, confidence, relative position, distance, etc.) describing one or more surrounding objects detected in each direction of the responsive vehicle (e.g., front, rear, left, right). In particular, as illustrated in FIG. 8, the positional aspect in the response 800 may include a coordinates attribute indicating the estimated GPS coordinates of the responsive vehicle as "40.765701° N, 111.860139° W," a length attribute indicating the length of the responsive vehicle as "467.36" (cm), and an orientation attribute indicating the estimated orientation of the responsive vehicle as "271" (degree).

As depicted in FIG. 8, the response 800 may include four aspects corresponding to front side, rear side, left side, and right side of the responsive vehicle. In particular, aspect "front" indicates that there is a vehicle in front of the responsive vehicle with the confidence score of 81.5%, and at a distance of 40.64 cm to the responsive vehicle. Aspect "rear" indicates that there is a vehicle in the rear of the responsive vehicle with the confidence score of 84.5%, and at a distance of 60.96 cm to the responsive vehicle. Aspect "left" indicates that there is no objects detected on the left side of the responsive vehicle. Aspect "right" indicates that there are two objects captured on the right side the responsive vehicle. The first object is a fire hydrant with the confidence score of 72.5%, at a relative position of 302° to the responsive vehicle, and at a distance of 254 cm to the responsive vehicle. The second object is a tree with the confidence score of 25.7%, at a relative position of 59° to the responsive vehicle, and at a distance of 812.8 cm to the responsive vehicle. In some embodiments, the response generated by the responsive vehicle may include other aspects of the situational context corresponding to the responsive vehicle.

Referring back to FIG. 6, in block 614, the message generator 202 may transmit the generated response to the requesting vehicle (e.g., the to-be-parked vehicle R920) or other responsive entities that broadcasted the request for the parking space.

Referring back to FIG. 3, in block 306, the response extractor 204 may extract one or more sets of response data from the one or more received responses. In particular, the response extractor 204 may extract a set of response data from each response that the to-be-parked vehicle R902 receives from the one or more responsive vehicles. In some embodiments, each set of response data is corresponding to a responsive vehicle that generated the particular response and may include the vehicle attributes and the situational context for that corresponding responsive vehicle. As discussed elsewhere herein, the vehicle attributes extracted from a particular response may include the vehicle information (e.g., make, model, color, unique vehicle identifier, measurements, etc.) of the corresponding responsive vehicle. The situational context extracted from a particular response may include positional data indicating the estimated position of the corresponding responsive vehicle (e.g., estimated GPS coordinates, vehicle length, distances from point of GPS coordinates to front end and rear end of the responsive vehicle, estimated orientation, etc.) and the directional object data describing one or more surrounding objects associated with the corresponding responsive vehicle (e.g., object type, confidence score, relative position, distance to responsive vehicle). As discussed elsewhere herein, the one or more surrounding objects associated with the corresponding responsive vehicle may be the surrounding objects captured by the externally facing sensors of the corresponding responsive vehicle.

It should be understood that in some embodiments, the to-be-parked vehicle R902 may receive the response (e.g., a structured data file) and the directional object data of the corresponding responsive vehicle may be parsed directly from the data file. In further embodiments, the received response may include the image sensor data captured by the externally facing sensors of the corresponding responsive vehicle. In these embodiments, the response extractor 204 may process the image sensor data (e.g., performing object recognition) to extract the directional object data of the corresponding responsive vehicle from the image sensor data. In some embodiments, the response extractor 204 may extract the directional object data from the image sensor data if the confidence score of object recognition performed by the corresponding responsive vehicle satisfies a predetermined threshold value (e.g., below 50%).

In some embodiments, the response filter 206 may filter the responses received from the responsive vehicle. Under most parking rules and regulations, vehicles are generally required to park in the same direction as the moving traffic. For example, in the parking situation illustrated in FIG. 9, the to-be-parked vehicle R920 needs to park on the same side of the street as its current moving direction (side A) and not on the other side of the street (side B). As a result, only the responses received from responsive vehicles parked on side A of the street 930 (e.g., responsive vehicles R908, R905, R901, and R909) are useful in creating the requested parking space for the to-be-parked vehicle R920. The responses received from the responsive vehicles parked on side B of the street 930 (e.g., responsive vehicles R911, R917, and R918) or from any responsive vehicles parked at different angle from the moving direction of the to-be-parked vehicle R920 in nearby areas can be filtered out.

Figure 5:
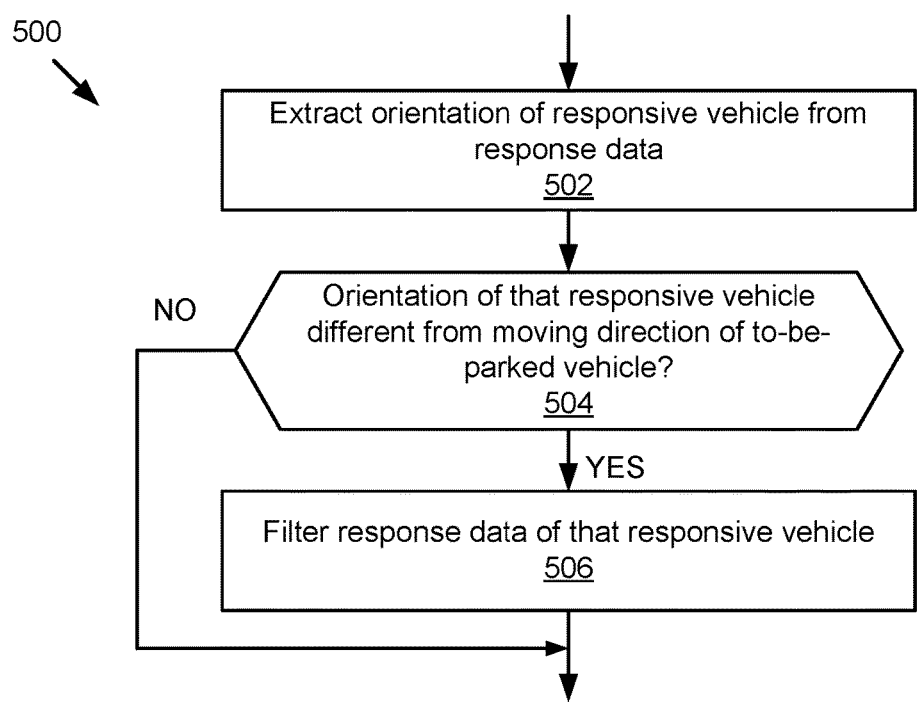
FIG. 5 is a flowchart of an example method for filtering responses received from responsive vehicles.

FIG. 5 is a flowchart of an example method 500 for filtering responses received from responsive vehicles. In block 502, the response filter 206 may extract the orientation of a particular responsive vehicle from the set of response data corresponding to that particular responsive vehicle. For example, the response filter 206 may determine that the estimated orientation of the responsive vehicle R911 is 93° based on the set of response data corresponding to the responsive vehicle R911, and the estimated orientation of the responsive vehicle R905 is 271° based on the set of response data corresponding to the responsive vehicle R905.

In block 504, the response filter 206 may determine whether the estimated orientation of the particular responsive vehicle is substantially different from the moving direction of the to-be-parked vehicle. In some embodiments, the estimated orientation of the particular responsive vehicle is considered substantially different from the moving direction of the to-be-parked vehicle if the angle difference between them satisfies a predetermined threshold value (e.g., 30°). If the estimated orientation of the particular responsive vehicle is substantially different from the moving direction of the to-be-parked vehicle, the method 500 proceeds to block 506. In block 506, the response filter 206 may filter the set of response data associated with the particular responsive vehicle from one or more sets of response data that the response extractor 204 extracted from the received responses. In some embodiments, if the estimated orientation of the particular responsive vehicle is not substantially different from the moving direction of the to-be-parked vehicle, the method 500 may end without removing the set of response data associated with the particular responsive vehicle, although other variations are also possible and contemplated.

Continuing the above example, the response filter 206 may compare the estimated orientation of the responsive vehicle R911 (e.g., 93°) and the estimated orientation of the responsive vehicle R905 (e.g., 271°) against the moving direction of the to-be-parked vehicle R920 (e.g., 273.5°). The response filter 206 may determine that the estimated orientation of the responsive vehicle R911 is substantially different from the moving direction of the to-be-parked vehicle R920 (e.g., the angle difference=180.5°>predetermined threshold of 30°). The response filter 206 may determine that the responsive vehicle R905 is not substantially different from the moving direction of the to-be-parked vehicle R920 (e.g., the angle difference=2.5°<predetermined threshold of 30°). In some cases, the response filter 206 may keep the set of response data associated with the responsive vehicle R905 while removing the set of response data associated with the responsive vehicle R911 from the one or more sets of response data extracted, although other variations are also possible and contemplated. In some embodiments, the response filter 206 may extract the estimated orientation from the received responses and remove irrelevant responses based on the extracted orientation before the received responses are fully processed by the response extractor 204. This implementation is particularly advantageous because only the responses useful for creating the requested parking space for the to-be-parked vehicle R920 are subjected to extraction by the response extractor 204.

Referring back to FIG. 3, in block 308, the parking model generator 208 may generate a dynamic parking model based on the vehicle attributes and/or the situational context included in each set of the one or more sets of response data. In some embodiments, the dynamic parking model may describe the current parking situation associated with a line of parallel-parked vehicles. As further described in details below, the dynamic parking model may include one or more virtual objects representing a sequence of responsive vehicles and one or more obstructions associated with the line of parallel-parked vehicles. In particular, the dynamic parking model may map one or more estimated positions of the one or more responsive vehicles. For each responsive vehicle, the dynamic parking model may further identify one or more estimated unutilized distances between the responsive vehicle and one or more surrounding objects corresponding to the responsive platform 107.

In some embodiments, the parking model generator 208 may retrieve data from a parking database that maintains dynamic parking availability data for a multiplicity of areas, including parking availability data associated with the area in which the parking space is being requested. The dynamic parking availability data may reflect parking states for each street covered by the database. The parking states for a given street may reflect whether parking is permitted on the street, which portions of a street parking is permitted on and which portions parking is not permitted, the hours in which the different portions of the street are available for parking, which portions are temporarily blocked due to temporal constraints (e.g., which may include but is not limited to weather, local event(s), construction, etc.), the directionality of the available parking, etc. The dynamic parking availability data may be correlated with street locations, geolocation data, and/or other information. The dynamic parking availability data may in some cases store information reflecting the parking positions of the vehicles and/or obstructions, as well as any other information in the parking requests and/or responses received.

As discussed elsewhere herein, the parking application 103 may comprise a plurality of distributed instances, one of which may operate on the server 103 and embody a cloud application with which responsive platforms 107 may communicate via the network 104. The server 101 may store and maintain, in non-transitory storage devices, the data comprising the parking database.

For instance, the server 101 may include a web server computer logic executable by a processor to respond to content requests. The web server may include an HTTP server, a REST (representational state transfer) service, or other suitable server type. The web server may receive content requests (e.g., HTTPS requests, proprietary requests, requests in other formats, etc.) from responsive platforms 107, cooperate with parking model generator 208 to retrieve, process, and/or incorporate data from the parking database, format the content, and provide the content to the requesting devices, although other variations are also possible and contemplated.

In some further embodiments, instances of the dynamic parking availability data may be cached in the memory 115 or data store of responsive platform(s) 107 for access and processing by a local instance of the parking application 103. The cached instances may be routinely updated as the information changes at a centralized server location (e.g., server 101).

In some embodiments, the dynamic parking availability data may be queried based on the location of the platform 107 requesting the parking space. For example, responsive to receiving the parking space request from a requesting platform 107, the parking application 103 may retrieve parking availability data based on the geolocation specified in the request and use when generating the dynamic parking model. The parking availability information may be used in conjunction with and/or in alternative to the response data received from surrounding vehicles. For example, different portions of the curb area (e.g., footprints) reflecting available or unavailable spaces in the dynamic parking model may be determined based on the parking availability data received from the parking database and correlated with the response data of the responsive platforms 107 to determine unutilized distances.

In some embodiments, the dynamic parking availability data retrieved from the database may reflect an updated state of the street and the method 300 may forego requesting response data from requesting platforms 107. For example, as responsive platforms 107 park, they may send their current parking location and sensor information that would otherwise be included in a response to an instance of the parking application 103 operating on the server 101, which may store that current parking location and sensor information in the database. Further, once those responsive platforms 107 later leave those parking locations, they may transmit data reflecting that the parking locations are not free (along with sensor data reflecting the state of the street as they leave, which the parking application 103 can use to determine the current state of that area, including what non-responsive cars are parked, any obstructions that have been placed in the area, and so forth.

Figure 4:
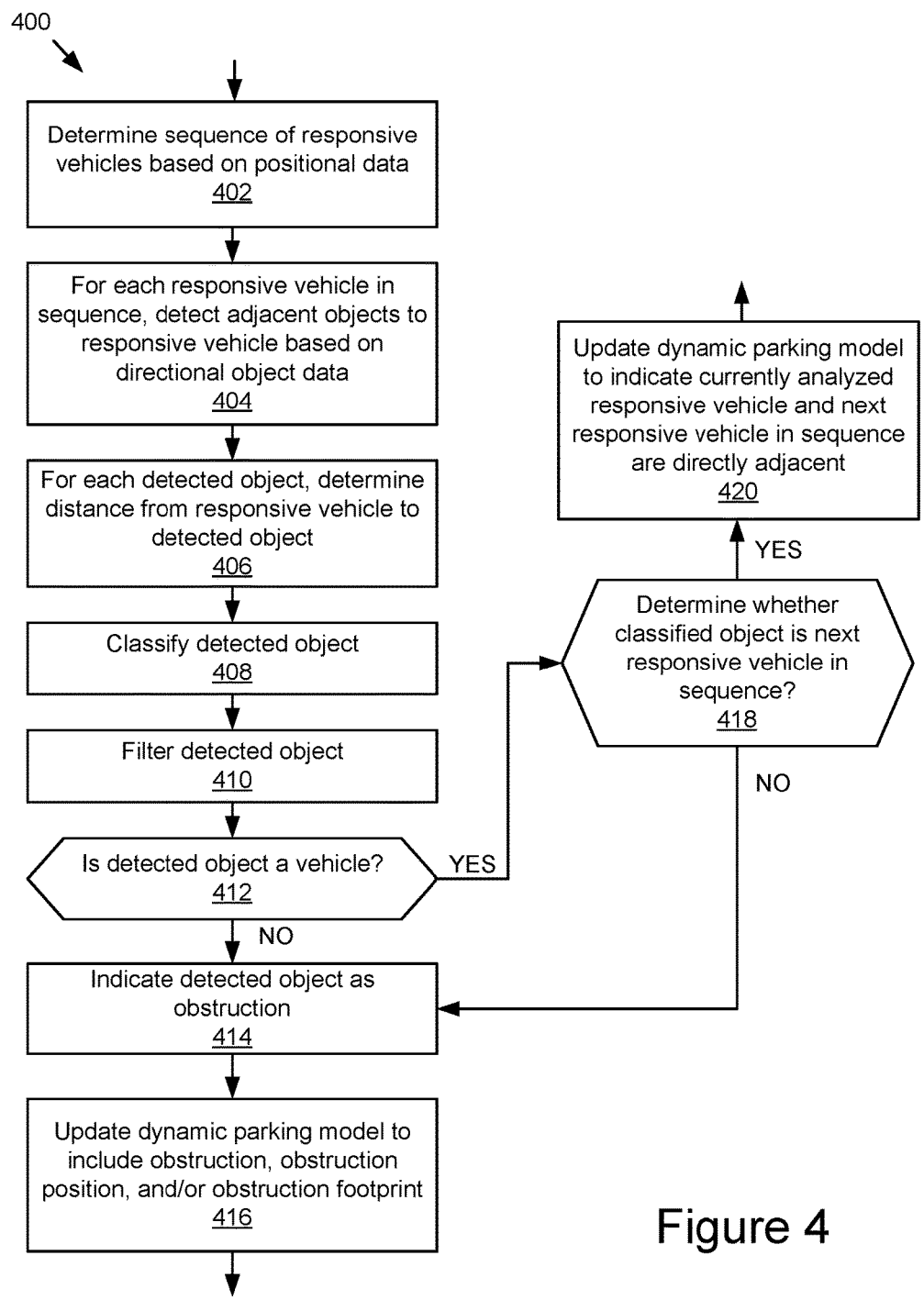
FIG. 4 is a flowchart of an example method for generating a dynamic parking model.

FIG. 4 is a flowchart of an example method 400 for generating the dynamic parking model. In block 402, the parking model generator 208 may determine a sequence of responsive vehicles based on the positional data associated with the one or more responsive vehicles. As discussed elsewhere herein, the positional data associated with a particular responsive vehicle may indicate the estimated position of that particular responsive vehicle, e.g., the estimated GPS coordinates. In some embodiments, the parking model generator 208 may use the estimated GPS coordinates of the responsive vehicles to map the relative positions of the responsive vehicles in the line of parallel-parked vehicles. As a result, a layout of the responsive vehicles and also their sequential order may be determined. In some embodiments, the sequence of responsive vehicles may include one responsive vehicle or a plurality of responsive vehicles. As an example, FIG. 10A illustrates a first parallel parking situation 1000 in which the line of parallel-parked vehicles includes only one responsive vehicle R1004. As another example, FIG. 11A illustrates a second parallel parking situation 1100 in which the line of parallel-parked vehicles includes a plurality of responsive vehicles. Based on the estimated GPS coordinates of the responsive vehicles included in the corresponding situational context, the parking model generator 208 may map the estimated positions of the responsive vehicles to determine the layout of the responsive vehicles in the line of parallel-parked vehicles, as well as their sequential order of (the responsive vehicle R1101, the responsive vehicle R1108, the responsive vehicle R1106, the responsive vehicle R1102, the responsive vehicle R1104) as depicted in FIG. 11A. In some embodiments, the parking model generator 208 may generate a sequence of vehicle footprints representing the sequence of responsive vehicles, and include the sequence of vehicle footprints in the dynamic parking model.

In block 404, for each responsive vehicle in the sequence of responsive vehicles, the parking model generator 208 may detect adjacent objects to the responsive vehicle based on the directional object data associated with the responsive vehicle. As discussed elsewhere herein, the directional object data associated with a particular responsive vehicle may describe one or more adjacent objects corresponding to that particular responsive vehicle. The one or more adjacent objects corresponding to the particular responsive vehicle may be the surrounding objects captured by externally facing sensors of the particular responsive vehicle. For example, in FIG. 10A, for the responsive vehicle R1004, the parking model generator 208 may detect a first object in front of the responsive vehicle R1004 (e.g., the trash can 1002) and a second object in the rear of the responsive vehicle R1004 (e.g., the curb 1006). As another example, in FIG. 11A, for the responsive vehicle R1104, the parking model generator 208 may detect a first object in front of the responsive vehicle R1104 (e.g., the vehicle R1102), a second object in the rear of the responsive vehicle R1104 (e.g., the vehicle N1109), and a third object on the right side of the responsive vehicle R1104 (e.g., a tree, not shown).

In block 406, for each detected object, the parking model generator 208 may determine a distance from the responsive vehicle to the detected object. In particular, the parking model generator 208 may determine the estimated distance from the responsive vehicle to the detected object based on the directional object data included in the situational context of the responsive vehicle. As discussed elsewhere herein, the directional object data associated with a particular responsive vehicle may include the estimated unutilized distances and/or the relative position between the particular responsive vehicle and the surrounding objects corresponding to the particular responsive vehicle. The surrounding objects corresponding to the particular responsive vehicle may be the surrounding objects captured by externally facing sensors of the responsive vehicle. For example, in FIG. 10A, the parking model generator 208 may determine the estimated distance 1011 from the responsive vehicle R1004 to the first object in front of the responsive vehicle R1004 (e.g., the trash can 1002) to be 213 cm, and the estimated distance 1012 from the responsive vehicle R1004 to the second object in the rear of the responsive vehicle R1004 (e.g., the curb 1006) to be 309 cm. As another example, in FIG. 11A, the parking model generator 208 may determine the estimated distance 1116 from the responsive vehicle R1104 to the first object in front of the responsive vehicle R1104 (e.g., the vehicle R1102) to be 172 cm, the estimated distance 1117 from the responsive vehicle R1104 to the second object in the rear of the responsive vehicle R1104 (e.g., the vehicle N1109) to be 25 cm, the estimated distance and the relative position from the responsive vehicle R1104 to the third object on the right side of the responsive vehicle R1104 (e.g., a tree, not shown) to be 812.8 cm and 59° (e.g., the angle between a vertical axis and the line defined by the tree and the responsive vehicle R1104 in 360°), respectively.

In block 408, the parking model generator 208 may classify each detected object into an object category. In particular, the parking model generator 208 may classify each detected object based on the type of object in the directional object data of the corresponding responsive vehicle. As discussed elsewhere herein, in some embodiments, the type of object may be parsed directly from the corresponding received response. Alternatively, the type of object may be recognized through object recognition performed by the response extractor 204 on the image sensor data included in the corresponding received response. Examples of the object category include, but are not limited to, an object category of "vehicle," an object category of "fire hydrant," an object category of "tree," an object category of "traffic sign," an object category of "parking meter," an object category of "road marking," an object category of "pedestrian," an object category of "pet," etc.

As an example, in FIG. 10A, the parking model generator 208 may classify the first object in front of the responsive vehicle R1004 into an object category of "trash can" (e.g., the trash can 1002), and the second object in the rear of the responsive vehicle R1004 into an object category of "curb" (e.g., the curb 1006). In FIG. 11A, the parking model generator 208 may classify the first object in front of the responsive vehicle R1104 into an object category of "vehicle" (e.g., the vehicle R1102), the second object in the rear of the responsive vehicle R1104 into the object category of "vehicle" (e.g., the vehicle N1109), and the third object on the right side of the responsive vehicle R1104 into an object category of "tree" (not shown).

As discussed elsewhere herein, in some embodiments, information used to generate the dynamic parking model may be sources from the parking database, such as from a remote instance hosted by the server 101 or a local instance. The data from the parking database may be used to determine the availability of parking on the street, or portions thereof, hours in which parking is unavailable (which may not in some cases be discernable from sensor data reflecting the state of the street or portion thereof, which portions of the street may be cordoned off or reserved because of various other events (e.g., construction, local event, emergency, etc.), the parking model generator 208 may retrieve the data from the parking database and use it in combination with response data from responsive vehicles to generate the parking model, and determine which vehicles to locate. This advantageously can help to further optimize the group of one or more vehicles to relocate.

In block 410, the parking model generator 208 may filter one or more detected objects, e.g., based on the object category of the one or more detected objects. For example, the parking model generator 208 may disregard the detected objects if their existence in the current parking situation is potentially temporary, such as detected objects classified into the object category of "pet" or the object category of "pedestrian."

In block 412, for each remaining detected object, the parking model generator 208 may determine whether the detected object is classified into the object category of "vehicle." If the parking model generator 208 determines that the detected object is classified into the object category of "vehicle," the method 400 proceeds to block 418. Otherwise, the method 400 proceeds to block 414.

In block 414, responsive to determining that the detected object is not classified into the object category of "vehicle," the parking model generator 208 may indicate the detected object as an obstruction. In particular, the parking model generator 208 may not classify the detected object into the object category of "vehicle" but into another object category (e.g., traffic sign, road marking, fire hydrant, tree, driveway, etc.) that represents an obstruction, the parking model generator 208 may therefore update the dynamic parking model to indicate that the detected object is an obstruction. For example, in FIG. 10A, the parking model generator 208 may determine that the first object in front of the responsive vehicle R1004 is classified as a trash can (e.g., the trash can 1002) and the second object in the rear of the responsive vehicle R1004 is classified as a curb (e.g., the curb 1006). Because the first object and the second object are classified into the object categories representing an obstruction (the object category of "trash can" and the object category of "curb"), the parking model generator 208 may indicate the first object (e.g., the trash can 1002) and the second object (e.g., the curb 1006) as obstructions in the dynamic parking model.

In block 416, the parking model generator 208 may update the dynamic parking model to include the obstruction, the obstruction position, and/or the obstruction footprint. In some embodiments, the parking model generator 208 may determine the obstruction position and/or obstruction footprint associated with the obstruction based on the positional data and the directional object data included in the situational context of the corresponding responsive vehicle. For example, in FIG. 10A, the parking model generator 208 may determine the obstruction position of the trash can 1002 based on the estimated position of the responsive vehicle R1004 and the estimated distance 1011 from the responsive vehicle R1004 to the trash can 1002 (e.g., 213 cm). The parking model generator 208 may determine the obstruction position of the curb 1006 based on the estimated position of the responsive vehicle R1004 and the estimated distance 1012 from the responsive vehicle R1004 to the curb 1006 (e.g., 309 cm). As another example, in FIG. 11A, the parking model generator 208 may determine the obstruction position of the tree (not shown) based on the estimated position of the responsive vehicle R1104, the estimated distance from the responsive vehicle R1004 to the tree (e.g., 812.8 cm), and the relative position from the responsive vehicle R1104 to the tree (e.g., 59°).

In some embodiments, the parking model generator 208 may determine the obstruction footprint based on the object category associated with the obstruction, the obstruction position of the obstruction, the parking rules and regulations, etc. In some embodiments, the obstruction footprint associated with an obstruction is a space in the line of parallel-parked vehicles that is unavailable for parking because of the obstruction (e.g., the space is occupied by the obstruction or regulated as no-parking zone by the obstruction).

As an example, in FIG. 10A, the parking model generator 208 may determine the obstruction footprint occupied by the trashcan 1002 to be an area having the standard average size of a trashcan and located at the obstruction position of the trash can 1002 in the line of parallel-parked vehicles. In another example, in FIG. 9, the parking model generator 208 may determine the obstruction footprint associated with the fire hydrant 940 to be an area in the line of parallel-parked vehicles within 15 feet from the obstruction position of the fire hydrant 940, as regulated by the parking rules. In another example, if the obstruction is classified into the object category of "tree" (e.g., the third object captured by the sensors of the responsive vehicle R1104 on its right side in FIG. 11A), the parking model generator 208 may determine that the obstruction has no obstruction footprint, because the tree planted in the area between the sidewalk and the curb does not affect the availability for parking in the line of parallel-parked vehicle.

In some embodiments, the parking model generator 208 may not be able to determine the size of the obstruction footprint from the directional object data captured by the corresponding responsive vehicle. For example, in FIG. 10A, the directional object data included in the situational context of the responsive vehicle R1004 may indicate the estimated distance 1011 from the responsive vehicle R1004 to the curb 1006, but may not indicate the length of the curb 1007 extending backwardly from the curb 1006. Therefore, it is impractical for the parking model generator 208 to determine the actual length of the obstruction footprint associated with the curb 1006. In this example, the parking model generator 208 may include in the dynamic parking model a default obstruction footprint of a predetermined size for the curb 1006, because the actual size of its corresponding obstruction footprint is unidentified.

Figure 12A:
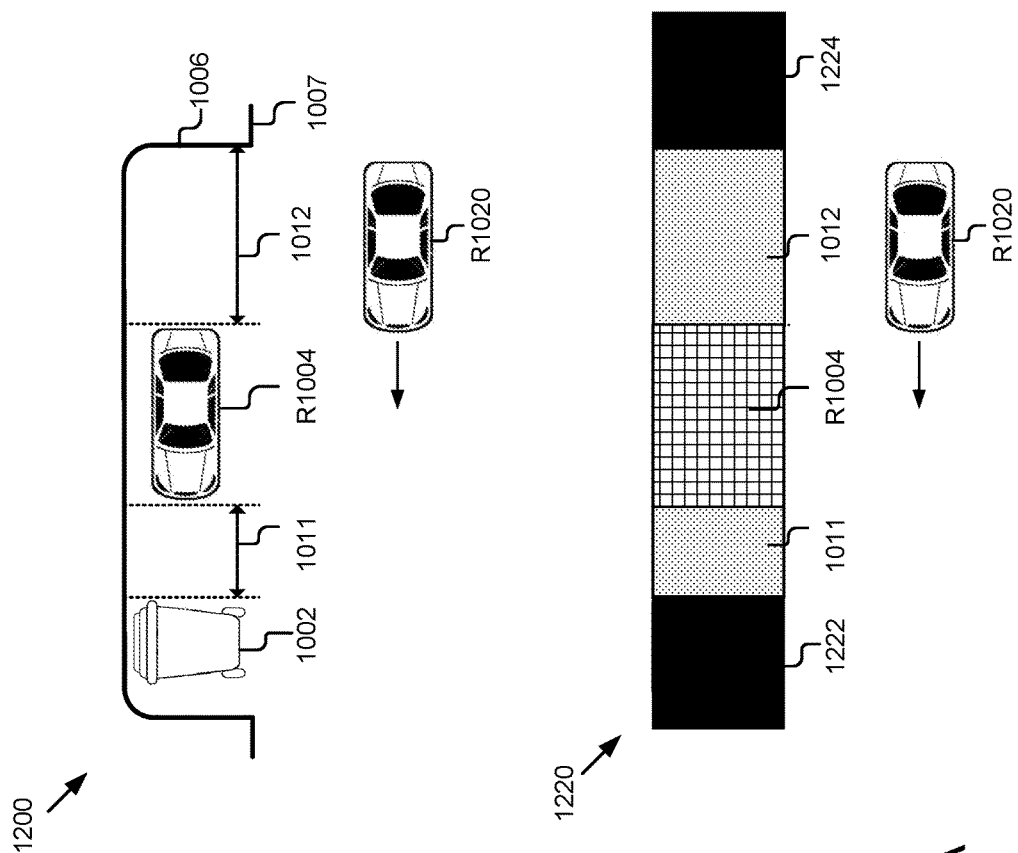
FIG. 12A depicts the first example parallel parking situation and a dynamic parking model corresponding to the first example parallel parking situation.

FIG. 12A illustrates a dynamic parking model 1220 corresponding to the parallel parking situation 1000 in FIG. 10A. The parallel parking situation 1000 is reproduced with the reference number 1200 in FIG. 12A to facilitate the illustration. As depicted, the dynamic parking model 1220 may include a sequence of vehicle footprints including one vehicle footprint R1004 that represents the responsive vehicle R1004. The dynamic parking model 1220 may also include an obstruction footprint 1222 associated with the trashcan 1002 (the obstruction detected in the front by the sensors of the responsive vehicle R1004) at the estimated distance 1011 (e.g., 213 cm) to the front of the responsive vehicle R1004. The length of the obstruction footprint 1222 may be the average size of a standard trash can. The dynamic parking model 1220 may also include an obstruction footprint 1224 associated with the curb 1006 (the obstruction detected in the rear by the sensors of the responsive vehicle R1004) at the estimated distance 1012 (e.g., 309 cm) to the rear of the responsive vehicle R1004. As discussed above, the obstruction footprint 1222 may be a default obstruction footprint with a predetermined length because the length of the curb 1007 extended backwardly from the curb 1006 is unknown. In some embodiments, the model 1220 components, such as vehicle footprints, obstruction footprints, and estimated distances, etc., comprise virtual objects that can be modified, updated, created, deleted, etc., such as table entries, a graphical model with predefined and distinguishable patterns, a structured data set with unique entries reflecting the model components, metadata, etc.

Referring back to FIG. 4, in block 418, responsive to determining that the detected object is classified as a vehicle, the parking model generator 208 may determine whether the detected object is a next responsive vehicle in the sequence of the responsive vehicles. In particular, if the detected object is classified into the object category representing a vehicle, the parking model generator 208 may determine whether that detected object is a responsive vehicle next to the responsive vehicle currently analyzed by the parking model generator 208 in the sequence of responsive vehicles or otherwise, a non-responsive vehicle. In some embodiments, the parking model generator 208 may determine whether the detected object adjacent to the responsive vehicle currently analyzed is the next responsive vehicle in the sequence of responsive vehicles based on a comparison of the estimated distance between the responsive vehicle currently analyzed and the detected object against the estimated distance between the next responsive vehicle in the sequence of responsive vehicles and a surrounding object adjacent to the next responsive vehicle.

Continuing the example parking situation 1100 depicted in FIG. 11A, the sequence of responsive vehicles include five responsive vehicles in the sequential order of (the responsive vehicle R1101, the responsive vehicle R1108, the responsive vehicle R1106, the responsive vehicle R1102, the responsive vehicle R1104). Thus, the responsive vehicle R1102 is next to the responsive vehicle R1106 in the sequence of responsive vehicles. For the responsive vehicle R1106, the parking model generator 208 may determine a first surrounding object at the estimated distance 1114 (e.g., 282 cm) in the front of the responsive vehicle R1106, and a second surrounding object at the estimated distance 1115 (e.g., 140 cm) in the rear of the responsive vehicle R1106. The parking model generator 208 may classify the first surrounding object and the second surrounding object adjacent to the responsive vehicle R1106 into the object category of "vehicle." For the responsive vehicle R1102, the parking model generator 208 may determine a first surrounding object at the estimated distance 1115' (e.g., 137.5 cm) in the front of the responsive vehicle R1102, and a second surrounding object at the estimated distance 1116 (e.g., 172 cm) in the rear of the responsive vehicle R1102. The parking model generator 208 may classify the first surrounding object and the second surrounding object adjacent to the responsive vehicle R1102 into the object category of "vehicle."

In this example, as the responsive vehicle R1102 is successive to the responsive vehicle R1106 in the sequence of responsive vehicles, the parking model generator 208 may compare the estimated distance 1115 from the responsive vehicle R1106 to the second surrounding object detected in the rear of the responsive vehicle R1106 against the estimated distance 1115' from the responsive vehicle R1102 to the first surrounding object detected in the front of the responsive vehicle R1102. The parking model generator 208 may determine that the estimated distance 1115 (e.g., 140 cm) is approximately equivalent to the estimated distance 1115' (e.g., 137.5 cm). As a result, the parking model generator 208 may determine that the second surrounding object detected in the rear of the responsive vehicle R1106 is the responsive vehicle R1102 next to the responsive vehicle R1106 in the sequence of responsive vehicles. Therefore, the responsive vehicle R1106 and the responsive vehicle R1102 are directly adjacent. In some embodiments, two estimated distances are considered approximately equivalent if the difference between them satisfies a predetermined threshold value (e.g., 10 cm).

If in block 418, the parking model generator 208 determines that the detected object adjacent to the currently analyzed responsive vehicle is the responsive vehicle next to the currently analyzed responsive vehicle in the sequence of responsive vehicles, the method 400 proceeds to block 420. In block 420, the parking model generator 208 may update the dynamic parking model to indicate that the currently analyzed responsive vehicle and the responsive vehicle next to the currently analyzed responsive vehicle in the sequence of responsive vehicles are directly adjacent. For example, the parking model generator 208 may update the dynamic parking model to indicate that the responsive vehicle R1106 and the responsive vehicle R1102 are directly adjacent, e.g., there is no obstruction in between them.

If in block 418, the parking model generator 208 determines that the detected object adjacent to the currently analyzed responsive vehicle is not the responsive vehicle next to the currently analyzed responsive vehicle in the sequence of responsive vehicles, the method 400 proceeds to block 414. As discussed above, in block 414, the parking model generator 208 may indicate the detected object as an obstruction. In particular, if the detected object captured by the sensors of the currently analyzed responsive vehicle is classified into the object category representing a vehicle, however, the detected object is not the responsive vehicle next to the currently analyzed responsive vehicle in the sequence of responsive vehicles, the parking model generator 208 may determine that the detected object is a non-responsive vehicle that did not respond to the request for the parking space. Because the non-responsive vehicle was not responsive to instructions, it may be unrelocatable and considered an obstruction in the line of parallel-parked vehicles. As discussed above, the method 400 then proceeds to block 416. In block 416, the parking model generator 208 may determine the obstruction position and the obstruction footprint associated with the obstruction (e.g., the detected object now determined to be a non-responsive vehicle). The parking model generator 208 may then update the dynamic parking model to indicate the detected object as an obstruction and to include the obstruction position and the obstruction footprint associated with the obstruction.

Continuing the example in FIG. 11A, the responsive vehicle R1106 is next to the responsive vehicle R1108 in the sequence of responsive vehicles. For the responsive vehicle R1108, the parking model generator 208 may determine a first surrounding object at the estimated distance 1112 (e.g., 181 cm) in the front, and a second surrounding object at the estimated distance 1113 (e.g., 390 cm) in the rear of the responsive vehicle R1108. The parking model generator 208 may classify the first surrounding object and the second surrounding object adjacent to the responsive vehicle R1108 into the object category of "vehicle."

In this example, as the responsive vehicle R1106 is successive to the responsive vehicle R1108 in the sequence of responsive vehicles, the parking model generator 208 may compare the estimated distance 1113 from the responsive vehicle R1108 to the second surrounding object detected in the rear of the responsive vehicle R1108 against the estimated distance 1114 from the responsive vehicle R1106 to the first surrounding object detected in the front of the responsive vehicle R1106. The parking model generator 208 may determine that the estimated distance 1113 (e.g., 390 cm) is not approximately equivalent to the estimated distance 1114 (e.g., 282 cm). Therefore, the parking model generator 208 may determine that the second surrounding object detected in the rear of the responsive vehicle R1108 (e.g., the vehicle N1107) is not the responsive vehicle R1106 next to the responsive vehicle R1108 in the sequence of responsive vehicles. Thus, the responsive vehicle R1108 and the responsive vehicle R1102 are not directly adjacent although they are sequential in the sequence of responsive vehicles. As a result, the parking model generator 208 may determine that the second surrounding object detected in the rear of the responsive vehicle R1108 (e.g., the vehicle N1107) is a non-responsive vehicle. The parking model generator 208 may determine that the first surrounding object detected in the front of the responsive vehicle R1106 (e.g., the vehicle N1105) is also a non-responsive vehicle.

In this example, the parking model generator 208 may then update the dynamic parking model to include obstruction footprints of the vehicle N1107 and the vehicle N1105 in the line of parallel-parked vehicles. For example, the parking model generator 208 may determine the obstruction position associated with the vehicle N1107 based on the estimated position of the responsive vehicle R1108 and the estimated distance 1113 (e.g., 390 cm) from the responsive vehicle R1108 to the vehicle N1107 detected in the rear of the responsive vehicle R1108. The parking model generator 208 may determine the obstruction position associated with the vehicle N1105 based on the estimated position of the responsive vehicle R1106 and the estimated distance 1114 (e.g., 282 cm) from the responsive vehicle R1106 to the vehicle N1105 detected in the front of the responsive vehicle R1106. Because the vehicle N1107 is a non-responsive vehicle and did not respond to the request of the parking space with its vehicle information (e.g., vehicle measurements) and situational context, the parking model generator 208 may determine a first obstruction footprint occupied by the vehicle N1107 to be an area having the average size of a vehicle and located at the obstruction position of the vehicle N1107 in the line of parallel-parked vehicles. Similarly, the parking model generator 208 may determine a second obstruction footprint occupied by the vehicle N1105 to be an area having the average size of a vehicle and located at the obstruction position of the vehicle N1105 in the line of parallel-parked vehicles. In this example, the parking model generator 208 may also determine that there is a distance between the first obstruction footprint occupied by the vehicle N1107 and the second obstruction footprint occupied by the vehicle N1105, but information of that distance is unknown. The parking model generator 208 may therefore determine such distance between the two obstruction footprints to be an undefined area.

In another example scenario, assuming that only one non-responsive vehicle (e.g., the vehicle N1107) is parked in between the responsive vehicle R1108 and the responsive vehicle R1106. In this example, the first obstruction footprint generated based on the situational context of the responsive vehicle R1108 (e.g., the estimated location of the responsive vehicle R1108, the estimated unutilized distance between responsive vehicle R1108 to the surrounding object detected in the rear of the responsive vehicle R1108) may substantially overlap with the second obstruction footprint generated based on the situational context of the responsive vehicle R1106 (e.g., the estimated location of the responsive vehicle R1106, the estimated unutilized distance between responsive vehicle R1106 to the surrounding object detected in the front of the responsive vehicle R1106), because these two obstruction footprints are actually associated with the same non-responsive vehicle N1107.

Figure 12B:
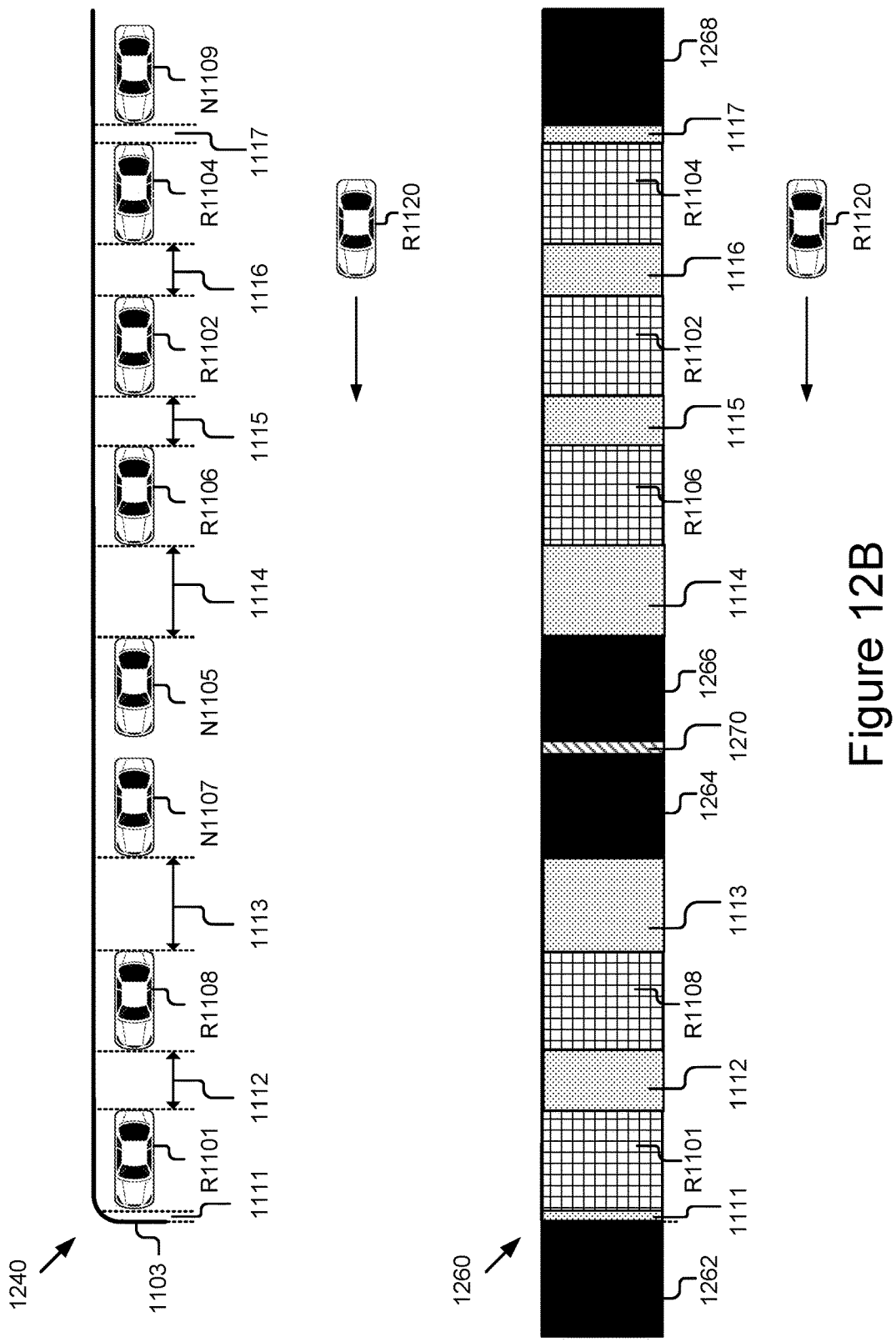
FIG. 12B depicts the second example parallel parking situation and a dynamic parking model corresponding to the second example parallel parking situation.

FIG. 12B illustrates a dynamic parking model 1260 corresponding to the parallel parking situation 1100 in FIG. 11A. The parallel parking situation 1100 is reproduced with the reference number 1240 in FIG. 12B to facilitate the illustration. As depicted, the dynamic parking model 1260 may include a sequence of vehicle footprints representing the responsive vehicles. In particular, the sequence of vehicle footprints may include the vehicle footprint R1101, the vehicle footprint R1108, the vehicle footprint R1106, the vehicle footprint R1102, and the vehicle footprint R1104 (respectively representing the responsive vehicle R1101, the responsive vehicle R1108, the responsive vehicle R1106, the responsive vehicle R1102, and the responsive vehicle R1104). The dynamic parking model 1260 may also include an obstruction footprint 1262 associated with the curb 1103 at the estimated distance 1111 (e.g., 15 cm) to the front of the responsive vehicle R1101. The obstruction footprint 1262 may be a default obstruction footprint with a predetermined length.

In this example, the dynamic parking model 1260 may include an obstruction footprint 1264 associated with the non-responsive vehicle N1107 and an obstruction footprint 1266 associated with the non-responsive vehicle N1105 as discussed above. The dynamic parking model 1260 may also include an undefined area 1270 between the obstruction footprint 1264 and the obstruction footprint 1266. The dynamic parking model 1260 may also include an obstruction footprint 1268 associated with the non-responsive vehicle N1109 at the estimated distance 1117 (e.g., 25 cm) to the rear of the responsive vehicle R1104. The obstruction footprint 1268 occupied by the non-responsive vehicle N1109 may have the length of an average-size vehicle. In some embodiments, the length of the average-size vehicle may be specific to a parking zone and may be determined based on a statistics of the vehicles usually park in the parking zone. In some embodiments, the vehicle footprints, the obstruction footprints, the estimated distances, and the undefined area may be represented as virtual objects with distinct patterns in the dynamic parking model 1260 as illustrated in FIG. 12B.

Referring back to FIG. 3, in block 310, the relocatable group determiner 210 may determine a group of relocatable vehicles based on the dynamic parking model. In some embodiments, the group of relocatable vehicles may include one or more responsive vehicles to be relocated to create the requested parking space. In block 312, the vehicle relocator 212 may instruct the responsive vehicles included in the group of relocatable vehicles to relocate to create the requested parking space.

Figure 7A:
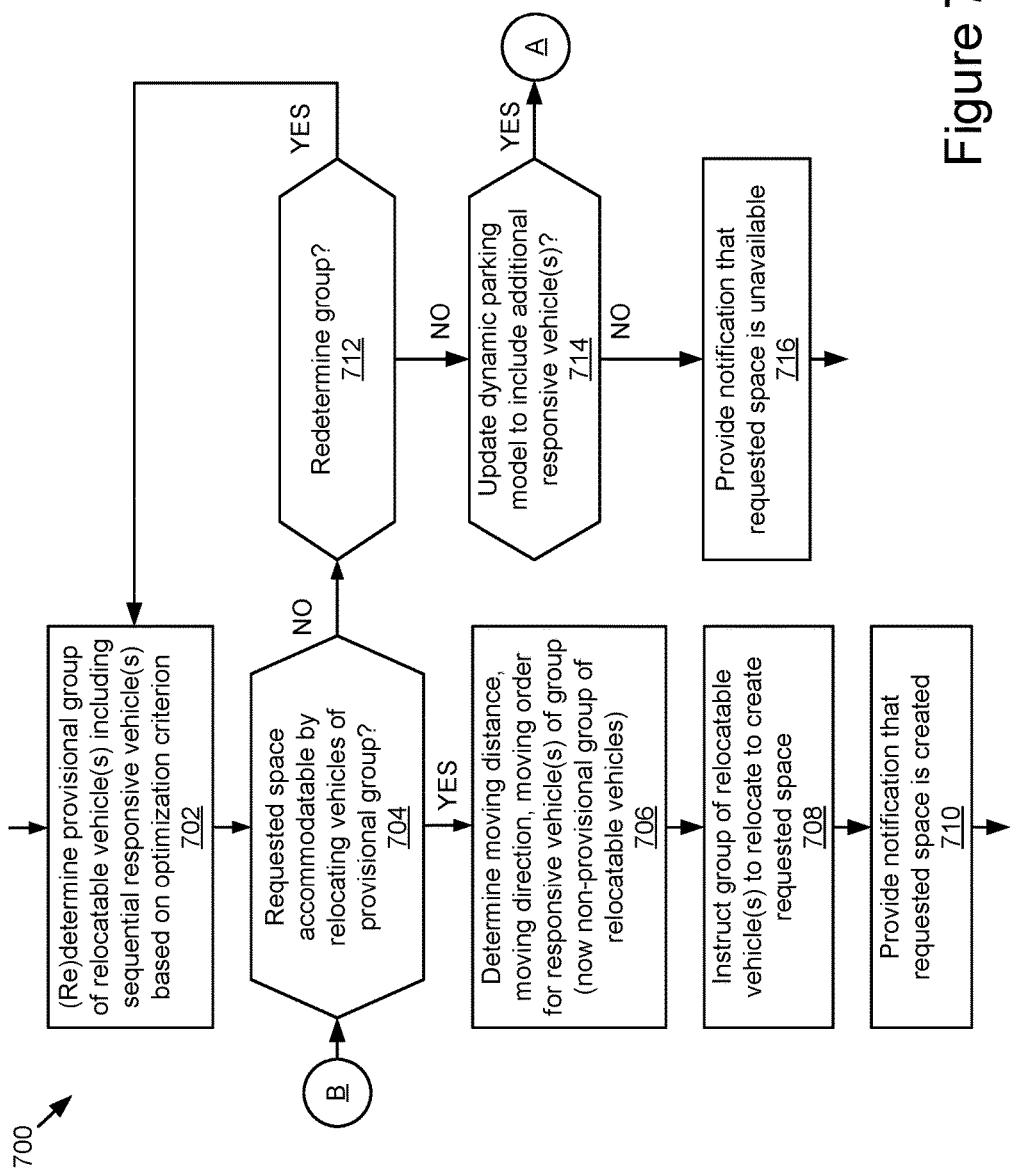
FIGS. 7A and 7B depict an example method for determining a group of relocatable vehicles and relocating the group of relocatable vehicles to create a requested parking space.
Figure 7B:
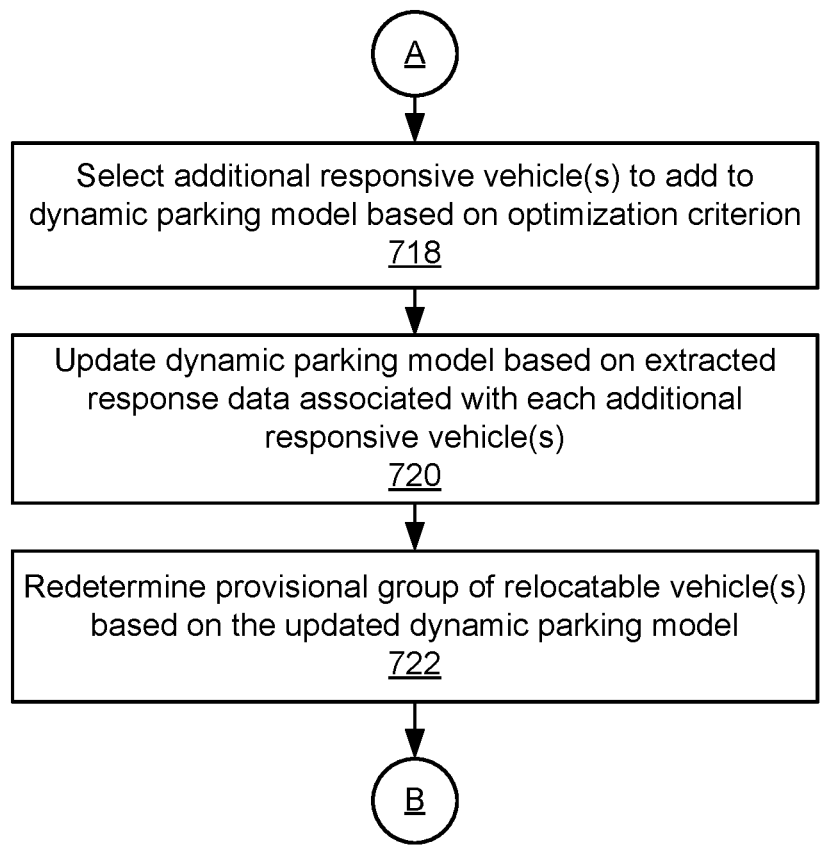

FIGS. 7A and 7B depict a flowchart of an example method 700 for determining a group of relocatable vehicles and relocating the group of relocatable vehicles to create the requested parking space. In block 702, the relocatable group determiner 210 may determine a provisional group of relocatable vehicles based on an optimization criterion. In some embodiments, the provisional group of relocatable vehicles may include one or more sequential responsive vehicles in the dynamic parking model selected based on the optimization criterion. For example, the provisional group of relocatable vehicles may be selected to minimize the distance between the current position of the to-be-parked vehicle and the provisional group of relocatable vehicles. In other examples, the provisional group of relocatable vehicles may be selected to minimize the number of responsive vehicles to be relocated, minimize the total moving distances of the responsive vehicles to create the requested parking space, minimize the largest moving distance of any individual responsive vehicle to create the requested parking space, maximize the amount of created parking space to accommodate additional vehicles without further relocation, increase the unutilized distances between the responsive vehicles currently parked too close to each other to facilitate their departures, minimize total energy consumption, etc. In some embodiments, the relocatable group determiner 210 may determine the provisional group of relocatable vehicles based on multiple optimization criteria. For example, the provisional group of relocatable vehicles may be selected to be as close as possible to the current position of the to-be-parked vehicle, and to relocate as fewer responsive vehicles as possible to create the requested parking space. In some embodiments, the multiple optimization criteria may be prioritized.

In block 704, the relocatable group determiner 210 may determine whether the requested parking space is accommodatable by the provisional group of relocatable vehicles. In particular, the relocatable group determiner 210 may determine whether the parking space created by relocating responsive vehicles in the provisional group of relocatable vehicles is adequate to accommodate the requested parking space. For example, the relocatable group determiner 210 may compute an estimated amount of available space generated by relocating the provisional group of relocatable vehicles, and compare the estimated amount of available space to the requested parking space. In some embodiments, the requested parking space may include the space occupied by the to-be-parked vehicle and the buffer space for the to-be-parked vehicle to enter the created parking space. In other embodiments, the requested parking space may include the buffer space for the requesting vehicle to exit the parking space it currently occupies. If the estimated amount of available space generated by relocating the provisional group of relocatable vehicles satisfies the requested parking space (e.g., the estimated amount of available space is greater or equal to the requested parking space), the relocatable group determiner 210 may determine that the requested parking space is accommodatable by the provisional group of relocatable vehicles. If in block 704, the relocatable group determiner 210 determines that the requested parking space is accommodatable by the provisional group of relocatable vehicles, the relocatable group determiner 210 may determine the provisional group of relocatable vehicles to be the non-provisional group of relocatable vehicles (also referred to herein simply as the group of one or more relocatable vehicles or the group of relocatable vehicles).

If in block 704, the relocatable group determiner 210 determines that the requested parking space is not accommodatable by the provisional group of relocatable vehicles, the method 700 proceeds to block 712. In block 712, the relocatable group determiner 210 may determine whether to redetermine the provisional group of relocatable vehicles. For example, the relocatable group determiner 210 may redetermine the provisional group of relocatable vehicles if the number of attempts to determine the provisional group of relocatable vehicles satisfies a threshold value (e.g., less than 5 times). If in block 712, the relocatable group determiner 210 determines to recompute the provisional group of relocatable vehicles, the method 700 proceeds to block 702 to redetermine the provisional group of relocatable vehicles based on the dynamic parking model as discussed above.

As an example, FIG. 10A and FIG. 10B respectively illustrate the first example parallel parking situation before and after the responsive vehicle is relocated to create the requested parking space. As illustrated in FIG. 12A, the dynamic parking model 1220 corresponding to this parking situation includes one responsive vehicle R1004. The estimated distance 1011 from the responsive vehicle R1004 to the obstruction footprint 1222 in front of the responsive vehicle R1004 is 213 cm, and the estimated distance 1012 from the responsive vehicle R1004 to the obstruction footprint 1224 in the rear of the responsive vehicle R1004 is 309 cm. In this parking situation, the relocatable group determiner 210 may determine that the provisional group of relocatable vehicles includes the only responsive vehicle R1004.

In this example, the relocatable group determiner 210 may compute the estimated amount of available space generated by relocating the provisional group of relocatable vehicles (e.g., the responsive vehicle R1004) to include the estimated distance 1011 and the estimated distance 1012, and exclude a cushion space (e.g., 15 cm) between the responsive vehicle R1004 and the obstruction footprint 1222. The estimated amount of available space is therefore determined to be 507 cm. In this example, assuming that the to-be-parked vehicle R1020 has the length of 467.36 cm and may require an additional buffer space of 35 cm for maneuvering. The requested parking space is therefore determined to be 502.36 cm. Because the estimated amount of available space generated by relocating the provisional group of relocatable vehicles (507 cm) satisfies the requested parking space (502.36 cm), the relocatable group determiner 210 may determine that the provisional group of relocatable vehicles (e.g., the responsive vehicle R1004) is the group of one or more relocatable vehicles. On the other hand, if the estimated amount of available space generated by relocating the provisional group of relocatable vehicles (e.g., the responsive vehicle R1004) does not satisfy the requested parking space, in this parking situation, the relocatable group determiner 210 may provide the to-be-parked vehicle R1020 with a notification that the requested parking space is unavailable. As the line of parallel-parked vehicles includes only one responsive vehicle R1004, there is no other possible provisional group of relocatable vehicles to be redetermined.

As another example, FIG. 11A and FIG. 11B respectively illustrate the second example parallel parking situation before and after a first group of relocatable vehicles is relocated to create the requested parking space. As illustrated in FIG. 12B, the dynamic parking model 1260 corresponding to this parking situation includes five responsive vehicles in the sequential order of (the responsive vehicle R1101, the responsive vehicle R1108, the responsive vehicle R1106, the responsive vehicle R1102, the responsive vehicle R1104). The estimated distance 1111 from the responsive vehicle R1101 to the obstruction footprint 1262 in front of the responsive vehicle R1101 is 15 cm, and the estimated distance 1112 from the responsive vehicle R1101 to the responsive vehicle R1108 in the rear of the responsive vehicle R1101 is 181 cm. The estimated distance 1113 from the responsive vehicle R1108 to the obstruction footprint 1264 in the rear of the responsive vehicle R1108 is 390 cm. The estimated distance 1114 from the responsive vehicle R1106 to the obstruction footprint 1266 in front of the responsive vehicle R1106 is 282 cm, and the estimated distance 1115 from the responsive vehicle R1106 to the responsive vehicle R1102 in the rear of the responsive vehicle R1106 is 140 cm. The estimated distance 1116 from the responsive vehicle R1104 to the responsive vehicle R1102 in front of the responsive vehicle R1104 is 172 cm, and the estimated distance 1117 from the responsive vehicle R1104 to the obstruction footprint 1268 in the rear of the responsive vehicle R1104 is 25 cm.

In this example, assuming that the optimization criterion for selecting the provisional group of relocatable vehicles is minimizing the distance from the provisional group of relocatable vehicles to the current position of the to-be-parked vehicle, and to minimize the number of responsive vehicles to be relocated. Accordingly, in some embodiments, the relocatable group determiner 210 may determine the provisional group of relocatable vehicles from the responsive vehicles located within a predetermined threshold distance (e.g., 500 cm) from the current position of the to-be-parked vehicle. Among the responsive vehicles located within the predetermined threshold distance from the current position of the to-be-parked vehicle, the provisional group of relocatable vehicles may include the responsive vehicle that has the largest estimated unutilized distance to its directly adjacent object (the directly adjacent object may be another responsive vehicle or an obstruction footprint in the line of parallel-parked vehicles). For example, in FIG. 12B, the relocatable group determiner 210 may determine that the responsive vehicle R1106, the responsive vehicle R1102, and the responsive vehicle R1104 are located within the predetermined threshold distance from the current position of the to-be-parked vehicle R1120. Among these three responsive vehicles, the relocatable group determiner 210 may determine that the responsive vehicle R1106 has the largest estimated unutilized distance to its directly adjacent object (e.g., 282 cm—the estimated distance 1114 to the obstruction footprint 1266). Therefore, the relocatable group determiner 210 may determine a first provisional group of relocatable vehicles to include one responsive vehicle R1106.

The relocatable group determiner 210 may then compute the estimated amount of available space generated by relocating the first provisional group of relocatable vehicles (e.g., the responsive vehicle R1106). The estimated amount of available space may include the estimated 1114 and the estimated distance 1115, and exclude a cushion space (e.g., 20 cm) between the responsive vehicle R1106 and the responsive vehicle R1102 so that pedestrians can walk between the vehicles. The estimated amount of available space is therefore determined to be 402 cm. In this example, assuming that the to-be-parked vehicle R1120 also has the length of 467.36 cm and needs an additional buffer space of 35 cm for maneuver. The requested parking space is therefore determined to be 502.36 cm. Because the estimated amount of available space generated by relocating the first provisional group of relocatable vehicles (402 cm) does not satisfy the requested parking space (502.36 cm) and the first provisional group of relocatable vehicles is the result of the first attempt, the relocatable group determiner 210 may redetermine the provisional group of relocatable vehicles. For example, the relocatable group determiner 210 may determine a second provisional group of relocatable vehicles to include the responsive vehicle R1106 and an additional responsive vehicle directly adjacent to the responsive vehicle R1106. Thus, the relocatable group determiner 210 may determine a second provisional group of relocatable vehicles to include a sequence of the responsive vehicle R1106 and the responsive vehicle R1102.

The relocatable group determiner 210 may then compute the estimated amount of available space generated by relocating the second provisional group of relocatable vehicles (e.g., the responsive vehicle R1106 and the responsive vehicle R1102). The estimated amount of available space may include the estimated distance 1114, the estimated distance 1115, and the estimated distance 1116. The estimated amount of available space may exclude a first cushion space (e.g., 20 cm) between the responsive vehicle R1104 and the responsive vehicle R1102 and a second cushion space (e.g., 20 cm) between the responsive vehicle R1102 and the responsive vehicle R1106. The estimated amount of available space is therefore determined to be 554 cm. Because the estimated amount of available space generated by relocating the second provisional group of relocatable vehicles (554 cm) satisfies the requested parking space (502.36 cm), the relocatable group determiner 210 may determine that the second provisional group of relocatable vehicles (e.g., the responsive vehicle R1106 and the responsive vehicle R1102) is the group of one or more relocatable vehicles.

Referring back to FIG. 7A, in block 706, the vehicle relocator 212 may determine the moving distance, the moving direction, and the moving order for each responsive vehicle included in the group of one or more relocatable vehicles based on the dynamic parking model. In block 708, the vehicle relocator 212 may instruct each responsive vehicle in the group of one or more relocatable vehicles to relocate based on the moving distance, the moving direction, and the moving order corresponding to that responsive vehicle to create the requested parking space. Alternatively, for each responsive vehicle in the group of one or more relocatable vehicles, the vehicle relocator 212 may compute the destination position (e.g., GPS coordinates) based on the source position, the moving direction, and the moving distance corresponding to that responsive vehicle. The source position may be the estimated position of the corresponding responsive vehicle before the relocation is performed. The vehicle relocator 212 may then instruct each responsive vehicle to relocate to its destination position in the moving order to create the requested parking space.

In some embodiments, the responsive vehicles in the group of one or more relocatable vehicles may execute the instructions to automatically relocate to the corresponding destination position with low-speed maneuvers. In some embodiments, the responsive vehicles may turn on a signal (e.g., hazard lights) while executing the relocation to notify nearby drivers and/or pedestrians about the movement. In some embodiments, the responsive vehicles may capture the surrounding environment during the movement at a predetermined interval to identify random objects (e.g., pedestrians, animals, vehicles passing by) that may unexpectedly appear in the surrounding environment. The responsive vehicles may temporarily terminate the executing relocation until these random objects are cleared. In some embodiments, the responsive vehicles may send to the to-be-parked vehicle a notification of temporary halt indicating that the relocation process is temporarily halted because of random objects present in the surrounding environment. The to-be-parked vehicle may display the notification of temporary halt to the users via the input/output device of the to-be-parked vehicle.

Continuing the above example depicted in FIGS. 10A, 10B, and 12A, as the group of one or more relocatable vehicles includes only one responsive vehicle R1004, the moving order needs not to be determined. In this example, the vehicle relocator 212 may determine the moving direction for the responsive vehicle R1004 is to move forward, because the estimated distance 1011 from the responsive vehicle R1004 to the obstruction footprint 1222 in front of the responsive vehicle R1004 (e.g., 213 cm) is larger than the cushion space 1021 left between the responsive vehicle R1004 and the obstruction footprint 1222 after executing the relocation (e.g., 15 cm). The vehicle relocator 212 may also determine the moving distance for the responsive vehicle R1004 to be the difference between the estimated distance 1011 and the cushion space 1021, e.g., 198 cm. Therefore, the vehicle relocator 212 may instruct the responsive vehicle R1004 to move forward 198 cm. As illustrated in FIGS. 10A and 10B, the created parking space 1022 generated by such movement of the responsive vehicle R1004 includes the estimated distance 1012 (e.g., 309 cm) and the moving distance of the responsive vehicle R1004 (e.g., 198 cm). Thus, the created parking space 1022 has the length of 507 cm and is adequate to accommodate the to-be-parked vehicle R1020 with the requested parking space of 502.36 cm.

Continuing the above example depicted in FIGS. 11A, 11B and 12B, the second group of one or more relocatable vehicles includes the responsive vehicle R1106 and the responsive vehicle R1102. For the group of relocatable vehicles that includes multiple responsive vehicles, the vehicle relocator 212 may select an initial space and expand the initial space into the requested parking space by relocating the responsive vehicles in the group of relocatable vehicles. For example, in some embodiments, the vehicle relocator 212 may select the initial space to be the largest estimated unutilized distance among the estimated unutilized distances associated with each responsive vehicle in the group of relocatable vehicles. The responsive vehicles in the group of relocatable vehicles that are parked in front of the initial space may be instructed to move forward. The responsive vehicles in the group of relocatable vehicles that are parked in the rear of the initial space may be instructed to move backward.

In some embodiments, the vehicle relocator 212 may determine the moving order for each responsive vehicle in the group of relocatable vehicles based on the relative position of that responsive vehicle to the initial space. For example, the responsive vehicles in the group of relocatable vehicles that are parked at the outermost position to the initial space may be instructed to move first, following by other responsive vehicles in the group of relocatable vehicles that are parked closer to the initial space. The responsive vehicles in the group of relocatable vehicles that are parked at the innermost position to the initial space may be the last responsive vehicle to relocate.

Accordingly, in this example, the vehicle relocator 212 may determine the initial space to be the estimated distance 1114 because the estimated distance 1114 is the largest estimated unutilized distance (e.g., 282 cm) among the estimated unutilized distances associated with the responsive vehicle R1106 and the responsive vehicle R1102 in the group of relocatable vehicles. The vehicle relocator 212 may determine the moving direction for the responsive vehicle R1106 and the responsive vehicle R1102 is to move backward because they are both parked in the rear of the estimated distance 1114. As the responsive vehicle R1102 is parked at the outermost position to the estimated distance 1114 among the two responsive vehicles in the group of relocatable vehicles, the vehicle relocator 212 may instruct the responsive vehicle R1102 to move first, and following by the responsive vehicle R1106.

In this example, the vehicle relocator 212 may determine the moving distance for the responsive vehicle R1102 to include the estimated distance 1116 (e.g., 172 cm) and exclude the cushion space 1126 (e.g., 20 cm) between the responsive vehicle R1102 and the responsive vehicle R1104. Thus, the vehicle relocator 212 may determine the moving distance for the responsive vehicle R1102 to be 152 cm. The vehicle relocator 212 may determine the moving distance for the responsive vehicle R1106 to include the estimated distance 1115 (e.g., 140 cm), the moving distance computed for the responsive vehicle R1102 (152 cm), and exclude the cushion space 1125 (e.g., 20 cm) between the responsive vehicle R1102 and the responsive vehicle R1106. Thus, the vehicle relocator 212 may determine the moving distance for the responsive vehicle R1106 to be 272 cm. As illustrated in FIGS. 11A and 11B, the created parking space 1124 generated by such movements of the responsive vehicle R1102 and the responsive vehicle R1104 includes the estimated distance 1114 (e.g., 282 cm) and the moving distance of the responsive vehicle R1106 (e.g., 272 cm). Thus, the created parking space 1124 has the length of 554 cm and is adequate to accommodate the to-be-parked vehicle R1120 with the requested parking space of 502.36 cm. In this example, because the responsive vehicle R1102 and the responsive vehicle R1106 both move backward as far as possible (e.g., only the predetermined cushion space is left between vehicles), the amount of created parking space is maximized.

It should be understood that the selection of the group of relocatable vehicles and the computation of moving direction, moving distance, moving order for each responsive vehicle in the group of relocatable vehicles may in some case be subjected to the desired optimization criterion. For example, in the parking situation depicted in FIGS. 11A, 11B, and 12B, if one optimization criterion is not to minimize the number of responsive vehicles to be relocated, but to maximize the amount of created parking space, the vehicle relocator 212 may determine the group of relocatable vehicles to include more responsive vehicles. In particular, the vehicle relocator 212 may determine the group of relocatable vehicles to include a sequence of the responsive vehicle R1106, the responsive vehicle R1102, and the responsive vehicle R1104 (as compared to including only responsive vehicle R1106 and the responsive vehicle R1102 in the example above).

As another example, if one optimization criterion is not to maximize the amount of created parking space, but to minimize the moving distance of each responsive vehicle in the group of relocatable vehicles to create the requested parking space, in this parking situation, the vehicle relocator 212 may determine the moving distance for the responsive vehicle R1106 to be the difference between the requested parking space (e.g., 502.36 cm) and the estimated distance 1114 (e.g., 282 cm). Thus, the vehicle relocator 212 may determine the moving distance for the responsive vehicle R1106 to be 220.36 cm (as compared to 272 cm in the example above). In order for the responsive vehicle R1106 to be able to move backward 220.36 cm, the responsive vehicle R1102 needs to move backward in advance. The vehicle relocator 212 may determine the moving distance for the responsive vehicle R1102 to include the difference between the moving distance of the responsive vehicle R1106 (e.g., 220.36 cm) and the estimated distance 1115 (e.g., 140 cm), and also include a cushion space (e.g., 20 cm) between the responsive vehicle R1102 and the responsive vehicle R1106. Thus, the vehicle relocator 212 may determine the moving distance for the responsive vehicle R1102 to be 100.36 cm (as compared to 152 cm in the example above).

After determining the moving distance, the moving direction, and the moving order for each responsive vehicle included in the group of relocatable vehicles, the vehicle relocator 212 may instruct each responsive vehicle in the group of relocatable vehicles to relocate based on the moving distance, the moving direction, and the moving order corresponding to that responsive vehicle. In some embodiments, when a responsive vehicle in the group of relocatable vehicles completes its instructed movement, the responsive vehicle may send a notification of complete movement to the vehicle relocator 212. Responsive to receiving the notification of complete movement, the vehicle relocator 212 may instruct the next responsive vehicle in the moving order to start relocating. Continuing the above example, the vehicle relocator 212 may instruct the responsive vehicle R1102 to move backward 152 cm. Upon receiving the notification of complete movement from the responsive vehicle R1102, the vehicle relocator 212 may instruct the responsive vehicle R1106 to move backward 272 cm.

Referring back to FIG. 7A, in block 710, the vehicle relocator 212 may provide a notification of space creation indicating that the requested parking space is created. If the vehicle relocator 212 is the component of the parking application 103 included in another requesting entity that coordinates the relocation of responsive vehicles on behalf of the to-be-parked vehicle, the vehicle relocator 212 may provide the notification of space creation to the to-be-parked vehicle. If the vehicle relocator 212 is the component of the parking application 103 included in the to-be-parked vehicle, the vehicle relocator 212 may provide the notification of space creation to the input/output device 119 of the to-be-parked vehicle to display to the users. In some embodiments, the vehicle relocator 212 may provide the notification of space creation upon receiving the notification of complete movement from the last responsive vehicle executing the relocation in the moving order. In some embodiments, the vehicle relocator 212 may determine the estimated position (e.g., geolocation coordinates, such as GPS coordinates, etc.) of the created parking space and include the estimated position of the created parking space in the notification of space creation. The vehicle relocator 212 may then instruct the to-be-parked vehicle to approach the created parking space at the estimated position and claim the created parking space.

Continuing the above example depicted in FIG. 11B, as the responsive vehicle R1106 is the last responsive vehicle to be relocated in the group of relocatable vehicles, the vehicle relocator 212 may provide the notification of space creation to the to-be-parked vehicle R1120 upon receiving the notification of complete movement from the responsive vehicle R1106. The notification of space creation may include the estimated position (e.g., geolocation coordinates) of the created parking space 1124. In this example, the vehicle relocator 212 may determine the estimated position of the created parking space 1124 based on the estimated position of the responsive vehicle R1106 before the relocation is performed, the moving direction distance of the responsive vehicle R1106, and the moving distance of the responsive vehicle R1106.

Alternatively, the vehicle relocator 212 may avoid computing the estimated position of the created parking space 1124, but instead, relying on the vehicle signal generated by the responsive vehicle R1106 to locate the created parking space 1124. For example, the vehicle relocator 212 may instruct the responsive vehicle R1106 to indicate its complete movement using a predetermined vehicle signal (e.g., blinking light or beeping sound). As the responsive vehicle R1106 is the last responsive vehicle to relocate in the group of relocatable vehicles, the responsive vehicle R1106 is therefore at the innermost position to the initial space 1114, which is now expanded into the created parking space 1124 after the relocation. As a result, the to-be-parked vehicle R1120 may locate the created parking space 1124 as being directly adjacent to (or nearby) the responsive vehicle R1106 that has the predetermined vehicle signal turned on.

Responsive to receiving the notification of space creation, the to-be-parked vehicle R1120 may approach the created parking space 1124 based on the estimated position of the created parking space 1124 included in the notification of space creation (or based on the predetermined vehicle signal generated by the responsive vehicle R1106). The to-be-parked vehicle R1120 may then perform the parallel parking maneuvers (automatically or manually by driver) to claim the created parking space 1124. FIG. 11C illustrates the corresponding parking situation after the created parking space 1124 is claimed by the to-be-parked vehicle R1120.

In some embodiments, responsive to the created parking space being claimed by the to-be-parked vehicle, the parking model generator 208 may update the dynamic parking model to include the to-be-parked vehicle as a responsive vehicle in the line of parallel-parked vehicles. In particular, as the to-be-parked vehicle claims the created parking space, the to-be-parked vehicle may generate a set of response data including the vehicle information and the situational context corresponding to the to-be-parked vehicle as discussed in details elsewhere herein. The to-be-parked vehicle may send the set of response data generated to the parking model generator 208. The parking model generator 208 may update the dynamic parking model to include the to-be-parked vehicle based on the set of response data corresponding to the to-be-parked vehicle. In some embodiments, the parking model generator 208 may also update the dynamic parking model to include the estimated position of each responsive vehicle in the group of relocatable vehicles after the relocation, as well as the estimated unutilized distances between each responsive vehicle in the group of relocatable vehicles to the surrounding objects corresponding to that responsive vehicle after the relocation.

Continuing the above example depicted in FIG. 11C and FIG. 12B, the parking model generator 208 may update the dynamic parking model to include the to-be-parked vehicle R1120 based on the set of response data corresponding the to-be-parked vehicle R1120. For example, the parking model generator 208 may use the estimated GPS coordinates of the to-be-parked vehicle R1120 to map the relative position of the to-be-parked vehicle R1120 in the line of parallel-parked vehicles. The parking model generator 208 may also determine the estimated distance 1128 from the to-be-parked vehicle R1120 to the obstruction footprint 1266 in front of the to-be-parked vehicle R1120 (e.g., 46 cm), and the estimated distance 1129 from the to-be-parked vehicle R1120 to the responsive vehicle R1106 in the rear of the to-be-parked vehicle R1120 (e.g., 40 cm), for example, based on the estimated distances between the to-be-parked vehicle R1120 and the surrounding objects included in the set of response data corresponding to the to-be-parked vehicle R1120.

In this example, the parking model generator 208 may also update the dynamic parking model with the updated estimated positions of the responsive vehicle R1102 and the responsive vehicle R1106. For example, the parking model generator 208 may determine the updated estimated position of the responsive vehicle R1102 based on the estimated position of the responsive vehicle R1102 before the relocation is performed, the moving direction distance of the responsive vehicle R1102 (e.g., moving backward), and the moving distance of the responsive vehicle R1102 (e.g., 152 cm). The parking model generator 208 may determine the updated estimated position of the responsive vehicle R1106 based on the estimated position of the responsive vehicle R1106 before the relocation is performed, the moving direction distance of the responsive vehicle R1106 (e.g., moving backward), and the moving distance of the responsive vehicle R1106 (e.g., 272 cm).

In this example, the parking model generator 208 may also update the dynamic parking model with the estimated unutilized distances between the responsive vehicle R1102 and corresponding surrounding objects after the relocation. For example, the parking model generator 208 may determine the estimated distance 1125 from the responsive vehicle R1102 to the responsive vehicle R1106 in front of the responsive vehicle R1102 to be 20 cm, and the estimated distance 1126 from the responsive vehicle R1102 to the responsive vehicle R1104 in the rear of the responsive vehicle R1102 to be 20 cm (because the relocation of the responsive vehicle R1102 and the responsive vehicle R1106 left a predetermined cushion space of 20 cm in between the vehicles). The parking model generator 208 may also update the dynamic parking model with the estimated unutilized distances between the responsive vehicle R1106 and the corresponding surrounding objects after the relocation. As discussed above, the estimated distance 1129 from the responsive vehicle R1106 to the to-be-parked vehicle R1120 in front of the responsive vehicle R1102 is 40 cm, and the estimated distance 1125 from the responsive vehicle R1106 to the responsive vehicle R1102 in the rear of the responsive vehicle R1106 is 20 cm.

In some embodiments, once the created parking space is claimed by the to-be-parked vehicle and the dynamic parking model is updated to indicate the parking situation after the relocation, one or more responsive vehicle may again be relocated to optimize the parking space utilization with the to-be-parked vehicle is now a responsive vehicle parked in the line. In particular, the relocatable group determiner 210 may determine a second group of one or more relocatable vehicles based on the updated dynamic parking model and an optimization criterion. In some embodiments, the second group of one or more relocatable vehicles may include one or more sequential responsive vehicles in the updated dynamic parking model selected based on the optimization criterion. It should be understood that the optimization criterion for selecting the second group of one or more relocatable vehicles may be the same as or different from the optimization criterion for selecting the first group of one or more relocatable vehicles to create the requested parking space. The one or more sequential responsive vehicles included in the second group of one or more relocatable vehicles may be the same as or different from the one or more sequential responsive vehicles included in the first group of one or more relocatable vehicles to create the requested parking space. The second group of one or more relocatable vehicles may include the to-be-parked vehicle (which is now a responsive vehicle in the line of parallel-parked vehicles) while the first group of one or more relocatable vehicles may not.

In some embodiments, the vehicle relocator 212 may determine the moving distance, the moving direction, and the moving order for each responsive vehicle included in the second group of one or more relocatable vehicles based on the updated dynamic parking model. The vehicle relocator 212 may then instruct each responsive vehicle in the second group of one or more relocatable vehicles to relocate based on the moving distance, the moving direction, and the moving order corresponding to that responsive vehicle. The operations performed by the vehicle relocator 212 have been described in details in the discussion above, and thus are not repeated again for brevity.

Continuing the above example, FIG. 11C and FIG. 11D respectively illustrate the parking situation when the created parking space 1124 is claimed, and when the second group of one or more relocatable vehicles are relocated after the to-be-parked vehicle R1120 claims the created parking space 1124. In this example, assuming that the optimization criterion for selecting the second group of one or more relocatable vehicles is to optimize the cushion space in between the vehicles to facilitate their subsequent departure. Accordingly, the relocatable group determiner 210 may determine the second group of one or more relocatable vehicles to include four responsive vehicles in the sequential order of (the responsive vehicle R1120, the responsive vehicle R1106, the responsive vehicle R1102, the responsive vehicle R1104). Thus, while the first group of one or more relocatable vehicles to create the requested parking space 1124 includes only two responsive vehicles (e.g., the responsive vehicle R1106 and the responsive vehicle R1102), the second group of one or more relocatable vehicles includes four responsive vehicles. Among these four responsive vehicles, the responsive vehicle R1120 is the to-be-parked vehicle R1120 that claimed the created parking space 1124.

In this example, to facilitate subsequent departure of the vehicles, the vehicle relocator 212 may redistribute the cushion spaces in between the responsive vehicles in the second group of one or more relocatable vehicles. In particular, the vehicle relocator 212 may compute the total amount of estimated unutilized distance associated with the second group of one or more relocatable vehicles. The vehicle relocator 212 may then redistribute that total amount of estimated unutilized distance evenly for each responsive vehicle in the second group of one or more relocatable vehicles. For example, the vehicle relocator 212 may sum up the estimated distance 1128 (e.g., 46 cm), the estimated distance 1129 (e.g., 40 cm), the estimated distance 1125 (e.g., 20 cm), the estimated distance 1126 (e.g., 20 cm), and the estimated distance 1127 (e.g., 25 cm, the estimated distance 1127 is the same as the estimated distance 1117 in the dynamic parking model 1260 because the responsive vehicle R1104 has not been relocated). Therefore, the vehicle relocator 212 may determine the total amount of estimated unutilized distance to be 151 cm. The vehicle relocator 212 may then divide the total amount of estimated unutilized distance of 151 cm into five cushion spaces of approximately 30 cm.

Accordingly, the vehicle relocator 212 may instruct the responsive vehicle R1120 to move forward 16 cm, the responsive vehicle R1106 to move forward 26 cm, the responsive vehicle 1120 to move forward 16 cm, and the responsive vehicle R1104 to move forward 6 cm. Because of this relocation, the estimated distance 1138, the estimated distance 1139, the estimated distance 1135, the estimated distance 1136, and the estimated distance 1137 each has the same length of 30 cm. Because each responsive vehicle in the second group of one or more relocatable vehicles has a cushion space of 30 cm in the front and in the rear as depicted in FIG. 11D, these responsive vehicles have enough buffer space to exit the current parking spot without further relocation. Similarly, after a departure of a vehicle in the line of parallel-parked vehicles, the responsive vehicles remaining in the line of parallel-parked vehicles may also be relocated to optimize the curb space utilization for accommodating to-be-parked vehicles that may later arrive at the parking zone.

In some embodiments, once the relocation of the responsive vehicles in the second group of one or more relocatable vehicles is completed, the parking model generator 208 may again update the dynamic parking model. In particular, the parking model generator 208 may update the dynamic parking model to include the estimated position of each responsive vehicle in the second group of one or more relocatable vehicles after the relocation, as well as the estimated unutilized distances between each responsive vehicle in the second group of one or more relocatable vehicles to the surrounding objects corresponding to that responsive vehicle after the relocation. In some embodiments, the parking application 103 may send the updated estimated position of the responsive vehicle after the relocation to an electronic device of a user associated with that responsive vehicle, e.g., via the communication unit 117. For example, the parking application 103 may send a message to the mobile phone of the user associated with the responsive vehicle R1106. The message may indicate that after two relocations (moving backward 272 cm for creating the requested parking space and moving forward 26 cm for redistributing cushion spaces), the responsive vehicle R1106 effectively moved backward 246 cm from its original position.

Referring back to FIG. 7A, if in block 712, the relocatable group determiner 210 determines not to recompute the provisional group of relocatable vehicles based on the dynamic parking model, the method 700 proceeds to block 714. In block 714, the parking model generator 208 may determine whether to update the dynamic parking model to include one or more additional responsive vehicles. For example, the parking model generator 208 may determine to update the dynamic parking model to include one or more additional responsive vehicles if the amount of processing time for determining the group of relocatable vehicles satisfies a threshold value (e.g., less than 2.5 minutes), or if the number of attempts to update the dynamic parking model satisfies a threshold value (e.g., less than 3 times). In another example, the parking model generator 208 may determine not to update the dynamic parking model to include one or more additional responsive vehicles if the estimated distances from the additional responsive vehicles to the to-be-parked vehicle satisfy a threshold value (e.g., more than 600 cm), or if there is no additional responsive vehicle to be included in the dynamic parking model.

If in block 714, the parking model generator 208 determines not to update the dynamic parking model to include one or more additional responsive vehicles, the method 700 proceeds to block 716. In block 716, the parking model generator 208 may provide a notification of unavailable space indicating that the requested parking space is unavailable. If the parking model generator 208 is the component of the parking application 103 included in another requesting entity that coordinates the relocation of responsive vehicles on behalf of the to-be-parked vehicle, the parking model generator 208 may provide the notification of unavailable space to the to-be-parked vehicle. If the parking model generator 208 is the component of the parking application 103 included in the to-be-parked vehicle, the parking model generator 208 may provide the notification of unavailable space to the input/output device 119 of the to-be-parked vehicle to display to the users.

If in block 714, the parking model generator 208 determines to update the dynamic parking model to include one or more additional responsive vehicles, the method 700 proceeds to block 718. In block 718, the parking model generator 208 may select one or more additional responsive vehicles to add to the dynamic parking model based on an optimization criterion. In some embodiments, the one or more additional responsive vehicles may be selected based on the same optimization criterion used to select the provisional group of relocatable vehicles. For example, the one or more additional responsive vehicles may be selected to be as close as possible to the current position of the to-be-parked vehicle.

In block 720, the parking model generator 208 may update the dynamic parking model to include the one or more additional responsive vehicles based on the set of response data associated with each additional responsive vehicle. In particular, for each additional responsive vehicle, the parking model generator 208 may use the estimated GPS coordinates of the additional responsive vehicle to map the relative position of the additional responsive vehicle in the line of parallel-parked vehicles, thus generating the updated dynamic parking model. For each additional responsive vehicle, the updated dynamic parking model may further identify one or more estimated unutilized distances between the additional responsive vehicle and one or more surrounding objects corresponding to that additional responsive vehicle. This implementation is particularly advantageous because it limits the number of responsive vehicles included the dynamic parking model. The dynamic parking model is updated to include more responsive vehicles only if the requested parking space cannot be accommodated. By avoiding generating the complete dynamic parking model if it is not necessary, the amount of computation can be substantially reduced.

In block 722, the relocatable group determiner 210 may redetermine the group of relocatable vehicles based on the updated dynamic parking model. The operations performed by the relocatable group determiner 210 have been described in details in the discussion above, and thus are not repeated again for brevity. The method 700 then proceeds to block 704.

For example, in the parking situation depicted in FIG. 11A, assuming that the parking model generator 208 generates a first dynamic parking model based on the sets of response data associated with the responsive vehicle R1106, the responsive vehicle R1102, and the responsive vehicle R1104. In this example, also assuming that the requested parking space for the to-be-parked vehicle R1120 is not accommodatable by any provisional group of relocatable vehicles determined based on the first dynamic parking model. Thus, the parking model generator 208 may update the first dynamic parking model to include additional responsive vehicles, e.g., the responsive vehicle R1101 and the responsive vehicle R1108.

Accordingly, the first dynamic parking model may be updated based on the set of response data associated with the responsive vehicle R1101 and the set of response data associated with the responsive vehicle R1108, resulting in a second dynamic parking model. In this example, the second dynamic parking model may include five responsive vehicles (the responsive vehicle R1101, the responsive vehicle R1108, the responsive vehicle R1106, the responsive vehicle R1102, the responsive vehicle R1104) and may have the form of the complete dynamic parking model 1260 depicted in FIG. 12B. The relocatable group determiner 210 may then redetermine the group of one or more relocatable vehicles based on the second dynamic parking model. For example, the relocatable group determiner 210 may determine the group of one or more relocatable vehicles to include one responsive vehicle R1108, because the responsive vehicle R1108 is closer to the current position of the to-be-parked vehicle R1120 than the responsive vehicle R1101.

In this example, the relocatable group determiner 210 may then compute the estimated amount of available space generated by relocating the responsive vehicle R1108. The estimated amount of available space may include the estimated distance 1112 (e.g., 181 cm) and the estimated distance 1113 (e.g., 390 cm), and exclude a cushion space (e.g., 20 cm) between the responsive vehicle R1101 and the responsive vehicle R1108. The estimated amount of available space is therefore determined to be 551 cm, and thus satisfies the requested parking space of 502.36 cm. Because the estimated distance 1112 from the responsive vehicle R1108 to the responsive vehicle R1102 (e.g., 181 cm) is larger than the cushion space left between the responsive vehicle R1108 and the responsive vehicle R1102 after executing the relocation (e.g., 20 cm), the vehicle relocator 212 may instruct the responsive vehicle R1108 to move forward 161 cm. Thus, by updating the first dynamic parking model to include more responsive vehicles, a possible relocation of responsive vehicles to create the requested parking space may be determined.

FIG. 11E illustrates the parking situation when the group of relocatable vehicles determined based on the second dynamic parking model (e.g., the responsive vehicle R1108) is relocated to create the requested parking space. As depicted, the movement of the responsive vehicle R1108 leaves the cushion space 1152 of 20 cm to the responsive vehicle R1102 in the front of the responsive vehicle R1108, and generate the created parking space 1153 in the rear of the responsive vehicle R1108. The created parking space 1153 includes the estimated distance 1113 (e.g., 390 cm) and the moving distance of the responsive vehicle R1108 (e.g., 161 cm), and thus has the length of 551 cm. FIG. 11E illustrates the parking situation when the created parking space 1153 is claimed by the to-be-parked vehicle R1120.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method comprising:
   broadcasting a request for a parking space;
   receiving one or more responses from one or more responsive vehicles;
   extracting one or more sets of response data from the one or more received responses, each set of the one or more sets of response data corresponding to a responsive vehicle and including a vehicle attribute and a situational context for that corresponding responsive vehicle;
   generating a dynamic parking model based on the vehicle attribute and the situational context included in each set of the one or more sets of response data, the dynamic parking model mapping one or more estimated positions of the one or more responsive vehicles, the dynamic parking model further identifying, for each responsive vehicle, one or more estimated unutilized distances between the responsive vehicle and one or more surrounding objects corresponding to the responsive vehicle;
   determining, from the one or more responsive vehicles, a group of one or more relocatable vehicles based on the dynamic parking model; and
   instructing the group of one or more relocatable vehicles to relocate to create the requested parking space.

2. The computer-implemented method of claim 1, wherein the situational context for a particular responsive vehicle from among the one or more responsive vehicles is extracted from a particular response received from the particular responsive vehicle, the situational context including positional data indicating an estimated position of the particular responsive vehicle and directional object data describing the one or more surrounding objects corresponding to the particular responsive vehicle that were captured by one or more externally-facing sensors of the particular responsive vehicle.

3. The computer-implemented method of claim 1, wherein generating the dynamic parking model includes:
   determining a sequence of a first responsive vehicle and a second responsive vehicle based on first positional data included in the situational context of the first responsive vehicle and second positional data included in the situational context of the second responsive vehicle;
   determining a first surrounding object adjacent to the first responsive vehicle and a first estimated unutilized distance from the first responsive vehicle to the first surrounding object based on first directional object data included in the situational context of the first responsive vehicle; and
   determining a second surrounding object adjacent to the second responsive vehicle and a second estimated unutilized distance from the second responsive vehicle to the second surrounding object based on second directional object data included in the situational context of the second responsive vehicle.

4. The computer-implemented method of claim 3, wherein generating the dynamic parking model includes:
   classifying the first surrounding object adjacent to the first responsive vehicle into an object category; and
   filtering the first surrounding object based on the object category of the first surrounding object.

5. The computer-implemented method of claim 3, wherein generating the dynamic parking model includes:
   classifying the first surrounding object adjacent to the first responsive vehicle into an object category;

determining that the object category represents an obstruction;

responsive to determining that the object category represents the obstruction, determining an obstruction position and an obstruction footprint associated with the first surrounding object based on the first positional data and the first directional object data included in the situational context of the first responsive vehicle; and updating the dynamic parking model to indicate that the first surrounding object is the obstruction and to include the obstruction position and the obstruction footprint associated with the obstruction.

6. The computer-implemented method of claim 3, wherein generating the dynamic parking model includes:

classifying the first surrounding object adjacent to the first responsive vehicle into an object category;

determining that the object category represents a vehicle; and responsive to determining that the object category represents the vehicle, determining that the first surrounding object adjacent to the first responsive vehicle is the second responsive vehicle and updating the dynamic parking model to indicate that the first responsive vehicle and the second responsive vehicle are directly adjacent.

7. The computer-implemented method of claim 6, wherein determining that the first surrounding object adjacent to the first responsive vehicle is the second responsive vehicle includes determining that the first estimated unutilized distance from the first responsive vehicle to the first surrounding object is approximately equivalent to the second estimated unutilized distance from the second responsive vehicle to the second surrounding object.

8. The computer-implemented method of claim 3, wherein generating the dynamic parking model includes:

classifying the first surrounding object adjacent to the first responsive vehicle into an object category;

determining that the object category represents a vehicle; and responsive to determining that the object category represents the vehicle, determining that the first surrounding object adjacent to the first responsive vehicle is not the second responsive vehicle and updating the dynamic parking model to indicate that the first surrounding object is an obstruction.

9. The computer-implemented method of claim 1, further comprising:

extracting an orientation of a particular responsive vehicle from a set of response data associated with the particular responsive vehicle;

determining that the orientation of the particular responsive vehicle is substantially different from a moving direction of a to-be-parked vehicle; and responsive to determining that the orientation of the particular responsive vehicle is substantially different from the moving direction of the to-be-parked vehicle, filtering the set of response data associated with the particular responsive vehicle from the one or more sets of response data.

10. The computer-implemented method of claim 1, wherein determining the group of one or more relocatable vehicles includes:

determining a provisional group of relocatable vehicles based on an optimization criterion, the provisional group of relocatable vehicles including one or more sequential responsive vehicles in the dynamic parking model;

determining that the requested parking space is accommodatable by the provisional group of relocatable vehicles; and responsive to determining that the requested parking space is accommodatable by the provisional group of relocatable vehicles, identifying the provisional group of relocatable vehicles to be the group of one or more relocatable vehicles.

11. The computer-implemented method of claim 10, wherein determining that the requested parking space is accommodatable by the provisional group of relocatable vehicles includes:

computing an estimated amount of available space generated by relocating the provisional group of relocatable vehicles; and comparing the estimated amount of available space to the requested parking space.

12. The computer-implemented method of claim 10, further comprising:

determining a moving distance, a moving direction, and a moving order for each responsive vehicle in the group of one or more relocatable vehicles; and instructing each responsive vehicle in the group of one or more relocatable vehicles to relocate based on the moving distance, the moving direction, and the moving order to create the requested parking space.

13. The computer-implemented method of claim 1, wherein determining the group of one or more relocatable vehicles includes:

determining a provisional group of relocatable vehicles based on an optimization criterion, the provisional group of relocatable vehicles including one or more sequential responsive vehicles in the dynamic parking model;

determining that the requested parking space is not accommodatable by the provisional group of relocatable vehicles; and redetermining the provisional group of relocatable vehicles based on the dynamic parking model.

14. The computer-implemented method of claim 1, wherein determining the group of one or more relocatable vehicles includes:

determining a provisional group of relocatable vehicles based on an optimization criterion, the provisional group of relocatable vehicles including one or more sequential responsive vehicles in the dynamic parking model;

determining that the requested parking space is not accommodatable by the provisional group of relocatable vehicles;

updating the dynamic parking model to include an additional responsive vehicle based on a set of response data associated with the additional responsive vehicle; and redetermining the provisional group of relocatable vehicles based on the updated dynamic parking model.

15. The computer-implemented method of claim 1, further comprising: retrieving dynamic parking availability data from a cloud parking application, wherein the dynamic parking model is further generated based on the dynamic parking availability data.

16. A computer-implemented method comprising:

broadcasting a request for a parking space;

receiving one or more responses from one or more responsive vehicles;

extracting one or more sets of response data from the one or more received responses;

generating a dynamic parking model based on the one or more sets of response data, the dynamic parking model mapping one or more estimated positions of the one or more responsive vehicles, the dynamic parking model further identifying, for each responsive vehicle, one or more estimated unutilized distances between the responsive vehicle and one or more surrounding objects corresponding to the responsive vehicle;

determining, from the one or more responsive vehicles, a first group of one or more relocatable vehicles based on the dynamic parking model;

instructing the first group of one or more relocatable vehicles to relocate to create the requested parking space; and instructing a to-be-parked vehicle to claim the created parking space.

17. The computer-implemented method of claim 16, further comprising:

responsive to the created parking space being claimed by the to-be-parked vehicle, updating the dynamic parking model to include the to-be-parked vehicle.

18. The computer-implemented method of claim 17, further comprising:

determining a second group of one or more relocatable vehicles based on an optimization criterion, the second group of one or more relocatable vehicles including one or more sequential responsive vehicles in the updated dynamic parking model;

determining a moving distance, a moving direction, and a moving order for each responsive vehicle in the second group of one or more relocatable vehicles; and instructing each responsive vehicle in the second group of one or more relocatable vehicles to relocate based on the moving distance, the moving direction, and the moving order.

19. The computer-implemented method of claim 18, wherein the second group of one or more relocatable vehicles includes the to-be-parked vehicle.

20. A system comprising:

one or more processors; and one or more memories storing instructions that, when executed by the one or more processors, cause the system to:

broadcast a request for a parking space;

receive one or more responses from one or more responsive vehicles;

extract one or more sets of response data from the one or more received responses, each set of the one or more sets of response data corresponding to a responsive vehicle and including a vehicle attribute and a situational context for that corresponding responsive vehicle;

generate a dynamic parking model based on the vehicle attribute and the situational context included in each set of the one or more sets of response data, the dynamic parking model mapping one or more estimated positions of the one or more responsive vehicles, the dynamic parking model further identifying, for each responsive vehicle, one or more estimated unutilized distances between the responsive vehicle and one or more surrounding objects corresponding to the responsive vehicle;

determine, from the one or more responsive vehicles, a group of one or more relocatable vehicles based on the dynamic parking model; and instruct the group of one or more relocatable vehicles to relocate to create the requested parking space.

21. The system of claim 20, wherein the situational context for a particular responsive vehicle from among the one or more responsive vehicles is extracted from a particular response received from the particular responsive vehicle, the situational context including positional data indicating an estimated position of the particular responsive vehicle and directional object data describing the one or more surrounding objects corresponding to the particular responsive vehicle that were captured by one or more externally-facing sensors of the particular responsive vehicle.

22. The system of claim 21, wherein generating the dynamic parking model includes:

determining a sequence of a first responsive vehicle and a second responsive vehicle based on first positional data included in the situational context of the first responsive vehicle and second positional data included in the situational context of the second responsive vehicle;

determining a first surrounding object adjacent to the first responsive vehicle and a first estimated unutilized distance from the first responsive vehicle to the first surrounding object based on first directional object data included in the situational context of the first responsive vehicle; and determining a second surrounding object adjacent to the second responsive vehicle and a second estimated unutilized distance from the second responsive vehicle to the second surrounding object based on second directional object data included in the situational context of the second responsive vehicle.

23. The system of claim 22, wherein generating the dynamic parking model includes:

classifying the first surrounding object adjacent to the first responsive vehicle into an object category; and filtering the first surrounding object based on the object category of the first surrounding object.

24. The system of claim 22, wherein generating the dynamic parking model includes:

classifying the first surrounding object adjacent to the first responsive vehicle into an object category;

determining that the object category represents an obstruction;

responsive to determining that the object category represents the obstruction, determining an obstruction position and an obstruction footprint associated with the first surrounding object based on the first positional data and the first directional object data included in the situational context of the first responsive vehicle; and updating the dynamic parking model to indicate that the first surrounding object is the obstruction and to include the obstruction position and the obstruction footprint associated with the obstruction.

25. The system of claim 22, wherein generating the dynamic parking model includes:

classifying the first surrounding object adjacent to the first responsive vehicle into an object category;

determining that the object category represents a vehicle; and responsive to determining that the object category represents the vehicle, determining that the first surrounding object adjacent to the first responsive vehicle is the second responsive vehicle and updating the dynamic parking model to indicate that the first responsive vehicle and the second responsive vehicle are directly adjacent.

26. The system of claim 25, wherein determining that the first surrounding object adjacent to the first responsive vehicle is the second responsive vehicle includes determining that the first estimated unutilized distance from the first responsive vehicle to the first surrounding object is approximately equivalent to the second estimated unutilized distance from the second responsive vehicle to the second surrounding object.

27. The system of claim 22, wherein generating the dynamic parking model includes:
classifying the first surrounding object adjacent to the first responsive vehicle into an object category;
determining that the object category represents a vehicle; and
responsive to determining that the object category represents the vehicle, determining that the first surrounding object adjacent to the first responsive vehicle is not the second responsive vehicle and updating the dynamic parking model to indicate that the first surrounding object is an obstruction.

28. The system of claim 20, wherein the instructions, when executed by the one or more processors, further cause the system to:
extract an orientation of a particular responsive vehicle from a set of response data associated with the particular responsive vehicle;
determine that the orientation of the particular responsive vehicle is substantially different from a moving direction of a to-be-parked vehicle; and
responsive to determining that the orientation of the particular responsive vehicle is substantially different from the moving direction of the to-be-parked vehicle, filter the set of response data associated with the particular responsive vehicle from the one or more sets of response data.

29. The system of claim 20, wherein determining the group of one or more relocatable vehicles includes:
determining a provisional group of relocatable vehicles based on an optimization criterion, the provisional group of relocatable vehicles including one or more sequential responsive vehicles in the dynamic parking model;
determining that the requested parking space is accommodatable by the provisional group of relocatable vehicles; and
responsive to determining that the requested parking space is accommodatable by the provisional group of relocatable vehicles, identifying the provisional group of relocatable vehicles to be the group of one or more relocatable vehicles.

30. The system of claim 29, wherein determining that the requested parking space is accommodatable by the provisional group of relocatable vehicles includes:
computing an estimated amount of available space generated by relocating the provisional group of relocatable vehicles; and
comparing the estimated amount of available space to the requested parking space.

31. The system of claim 29, wherein the instructions, when executed by the one or more processors, further cause the system to:
determining a moving distance, a moving direction, and a moving order for each responsive vehicle in the group of one or more relocatable vehicles; and
instructing each responsive vehicle in the group of one or more relocatable vehicles to relocate based on the moving distance, the moving direction, and the moving order to create the requested parking space.

32. The system of claim 20, wherein determining the group of one or more relocatable vehicles includes:
determining a provisional group of relocatable vehicles based on an optimization criterion, the provisional group of relocatable vehicles including one or more sequential responsive vehicles in the dynamic parking model;
determining that the requested parking space is not accommodatable by the provisional group of relocatable vehicles; and
redetermining the provisional group of relocatable vehicles based on the dynamic parking model.

33. The system of claim 20, wherein determining the group of one or more relocatable vehicles includes:
determining a provisional group of relocatable vehicles based on an optimization criterion, the provisional group of relocatable vehicles including one or more sequential responsive vehicles in the dynamic parking model;
determining that the requested parking space is not accommodatable by the provisional group of relocatable vehicles;
updating the dynamic parking model to include an additional responsive vehicle based on a set of response data associated with the additional responsive vehicle; and
redetermining the provisional group of relocatable vehicles based on the updated dynamic parking model.

* * * * *